(12) United States Patent
Kalajan

(10) Patent No.: US 8,644,702 B1
(45) Date of Patent: Feb. 4, 2014

(54) COMPUTER-IMPLEMENTED SYSTEM AND METHOD FOR NOTIFYING USERS UPON THE OCCURRENCE OF AN EVENT

(75) Inventor: Kevin E. Kalajan, Nevada City, CA (US)

(73) Assignee: XI Processing L.L.C., Dover, DE (US)

( * ) Notice: Subject to any disclaimer, the term of this patent is extended or adjusted under 35 U.S.C. 154(b) by 1094 days.

(21) Appl. No.: 11/321,154

(22) Filed: Dec. 28, 2005

(51) Int. Cl.
*G03B 17/48* (2006.01)

(52) U.S. Cl.
USPC ............................................. 396/429

(58) Field of Classification Search
USPC ................................................ 396/429, 433
See application file for complete search history.

(56) References Cited

U.S. PATENT DOCUMENTS

| | | | |
|---|---|---|---|
| 4,876,597 A | 10/1989 | Roy et al. | |
| 5,553,609 A | 9/1996 | Chen et al. | |
| 5,737,491 A | 4/1998 | Allen et al. | |
| 5,793,281 A * | 8/1998 | Long ........................... | 340/384.1 |
| 6,038,295 A | 3/2000 | Mattes | |
| 6,122,526 A | 9/2000 | Parulski et al. | |
| 6,256,059 B1 | 7/2001 | Fichtner | |
| 6,263,201 B1 * | 7/2001 | Hashimoto et al. ........... | 455/403 |
| 6,278,466 B1 | 8/2001 | Chen | |
| 6,553,100 B1 * | 4/2003 | Chen et al. ..................... | 379/37 |
| 6,751,454 B2 | 6/2004 | Thornton | |
| 6,763,384 B1 * | 7/2004 | Gupta et al. .................. | 709/224 |
| 6,784,925 B1 | 8/2004 | Tomat et al. | |
| 6,847,334 B2 | 1/2005 | Hayhurst et al. | |
| 6,995,789 B2 | 2/2006 | McIntyre et al. | |
| 7,034,880 B1 | 4/2006 | Endsley et al. | |
| 7,117,519 B1 * | 10/2006 | Anderson et al. ............. | 725/105 |
| 7,170,551 B2 | 1/2007 | Fichtner | |
| 7,188,307 B2 | 3/2007 | Ohsawa | |
| 7,239,346 B1 | 7/2007 | Priddy | |
| 7,343,049 B2 | 3/2008 | Butterworth | |
| 2002/0046299 A1 * | 4/2002 | Lefeber et al. ................ | 709/318 |
| 2002/0108118 A1 * | 8/2002 | Cohen et al. .................. | 725/105 |
| 2003/0045279 A1 * | 3/2003 | Shostak ........................ | 455/422 |
| 2004/0061667 A1 | 4/2004 | Sawano | |
| 2004/0174434 A1 | 9/2004 | Walker et al. | |
| 2004/0199663 A1 * | 10/2004 | Horvitz et al. ................ | 709/238 |
| 2004/0260598 A1 * | 12/2004 | Kumhyr et al. ................ | 705/10 |
| 2004/0264542 A1 | 12/2004 | Kienitz | |
| 2005/0036034 A1 | 2/2005 | Rea et al. | |
| 2005/0044258 A1 * | 2/2005 | Nakamura ..................... | 709/232 |
| 2005/0209904 A1 * | 9/2005 | Hayashi ............................ | 705/9 |
| 2006/0105806 A1 | 5/2006 | Vance et al. | |
| 2006/0142059 A1 * | 6/2006 | Ishiguro et al. ............. | 455/556.1 |
| 2007/0008321 A1 | 1/2007 | Gallagher et al. | |
| 2009/0276328 A1 * | 11/2009 | Svendsen et al. .............. | 705/26 |
| 2010/0110186 A1 * | 5/2010 | Julia et al. ..................... | 348/143 |
| 2010/0122190 A1 * | 5/2010 | Lu ................................. | 715/764 |
| 2011/0263227 A1 * | 10/2011 | Khoury et al. .............. | 455/412.2 |
| 2011/0265136 A1 * | 10/2011 | Liwerant et al. .............. | 725/112 |
| 2011/0282956 A1 * | 11/2011 | Reistad ......................... | 709/206 |

* cited by examiner

*Primary Examiner* — Clayton E Laballe
*Assistant Examiner* — Linda B Smith
(74) *Attorney, Agent, or Firm* — Turocy & Watson, LLP

(57) ABSTRACT

A computer-implemented system and method for notifying users on the occurrence of an event is disclosed. An embodiment further includes notifying selected users upon the occurrence of particular events in sessions using a variety of notification methods.

34 Claims, 24 Drawing Sheets

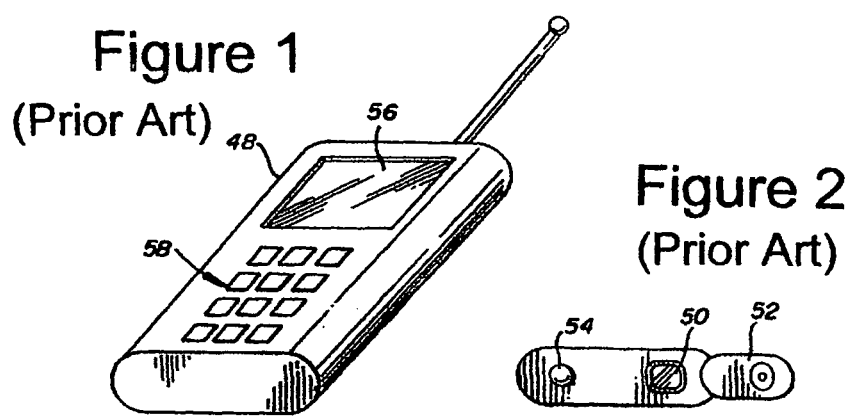

COMPUTER-IMPLEMENTED SYSTEM AND METHOD FOR NOTIFYING USERS UPON THE OCCURRENCE OF AN EVENT

BACKGROUND

1. Related Application

This patent application is related to co-pending patent application Ser. No. 11/281,193; both filed by the same applicant.

2. Technical Field

Embodiments relate to the field of computer network applications and networked communications.

RELATED ART

Camera-enabled mobile devices continue to show an increasing popularity. Typical user paradigms include user-initiated image or video capture with operator-specific post processing options, including for example, save locally, e-mail, send via MMS, upload to a web site, etc. Much of the mobile device industry is focused on delivering content to mobile devices. Clearly, the delivery of content to mobile devices is critical and useful. However, as mobile devices increase in power and functionality, these devices become increasingly important as sources of content in addition to being consumers of content. One important source of content on these devices is the image or video capture components provided with camera-enabled mobile devices. It would be advantageous to be able to upload these images to a server and to notify users of the availability of the uploaded images. Conventional systems do not provide such functionality.

U.S. Patent Application Publication No. 2002/0108118A1 describes a digital data storage and transmitting device particularly suited for use with a digital camera, digital camcorder, or other image/video capturing device. The digital data storage and transmitting device is configured in to upload or transmit picture information to a remote server using any of a number of communication protocols or techniques, including wireless or cell phone technologies. However, the device described in the referenced patent application is a wireless digital camera adapter and not a camera-enabled mobile telephone.

U.S. Pat. No. 6,847,334 describes a mobile telecommunication device for simultaneously transmitting and receiving sound and image data. The described mobile telecommunication unit provides two-way remote viewing of images and real-time audio. The self-contained portable unit communicates directly with a similar unit at a remote location across POTS lines, cellular, ISDN, T-1, and satellite communications links. In one implementation of the system described in the referenced patent, a portable, mobile telecommunication unit is designed to transmit voice, and still image data simultaneously to a compatible device on the other end of a telephone connection. One unit is placed into contact with the second, compatible device by a phone call. To capture an image the user takes a picture with a digital camera provided with the unit. Through a camera interface, the digital camera transfers an image to the local unit. The local unit can then transmit the image to the remote unit. The device described in the '334 patent does not automatically capture images with a camera-enabled mobile device and does not upload images to a network server. Further, the referenced patent does not describe a way to archive and automatically animate (convert images to movies) the automatically uploaded images. Additionally, the referenced patent does not describe the automatic archiving and sharing of the transmitted image data.

U.S. Pat. No. 5,553,609 describes an intelligent remote visual monitoring system for home health care service. In this system, a computer-based remote visual monitoring system is provided for in home patient health care from a remote location via ordinary telephone lines. A number of master monitoring computers are linked to a control center and are accessible by a corresponding number of health care professionals. A slave monitoring computer is located within the home of a plurality of patients and may be linked via telephone modems to any of the master monitoring computers. Audio/visual equipment at both locations, permits real-time two-way communications during an in-home visit to a patient by a healthcare professional from a remote location. However, the '609 patent does not describe a system in that uses camera-enabled mobile devices to upload images to a networked server. Further, the referenced patent does not describe a way to archive and automatically animate (convert images to movies) the automatically uploaded images.

U.S. Pat. No. 4,876,597 describes a system wherein a scene to be monitored (e.g., at a remote location or at a later time) is captured as a series of still images. These images are digitally encoded and stored in a digital memory for subsequent retrieval and viewing. If the scene includes a moving object (e.g., the side of a moving freight train), the images may be taken so that they are substantially mutually exclusive and collectively exhaustive of the moving object. During playback, two or more adjacent images may be displayed adjacent to one another so that any feature partly present in adjacent images is visible as a whole. If the observer is at a location remote from the point at which the images are taken, various techniques can be used to facilitate transmission of the image information (preferably in digital form) via relatively low-cost transmission links such as voice-grade telephone lines. The '597 patent is further described as an invention that will be fully understood from an explanation of its use in identifying moving railroad freight cars, especially (although not necessarily) at locations remote from the observer required to make the identification. Thus, the '597 patent does not describe the use of a mobile device for capturing images. Further, the referenced patent does not describe a way to archive and automatically animate (convert images to movies) the automatically uploaded images.

U.S. Pat. No. 6,122,526 describes a combined telephone/camera unit that includes a camera module for generating electronic image data representative of a scene to be imaged, a memory unit for storing the electronic image data generated by the camera module, a display screen for displaying the electronic image data stored in the memory unit, a mechanism for selecting which of the plurality of base units is to receive the digital image data, and a cellular transceiver for transmitting the digital image data to the base units selected by the selection mechanism. However, the '526 patent does not describe a system in that uses camera-enabled mobile devices to automatically upload images to a networked server on a periodic basis. Further, the referenced patent does not describe a way to archive and automatically animate (convert images to movies) the automatically uploaded images.

U.S. Pat. No. 6,980,993 describes a schema-based notification platform that provides regularized notification handling including user control and normalization of the operation of policies across different information types and contexts. Information-service schemas and services are combined to build a content-sensitive and context-sensitive information service to communicate information to recipient devices of users that subscribe to those services. An information agent service collects the information, and based on various criteria, determines if, when, and how to send and render the information, and to which subscribing client device or devices. The set of schemas include a notification schema that represents the subscription of a service to an information source and details about that information, and a device schema that represents information about user devices. The information agent service accesses criteria including user preferences and user contextual information, including presence information, location information, and schedule information along with people and groups data and extended-context data. Preferences about subscriptions and information handling policies may be stored and used at notification sources or in more central preference encodings. Access to multiple preferences is maintained, and a user interface is provided that allows users to inspect and control multiple subscriptions in one conceptual place.

U.S. Pat. No. 6,977,585 describes a monitoring system and method that allows customization of a monitoring system and method according to a user's instruction, thereby achieving a higher flexibility in configuring the monitoring scheme. The monitoring system comprises a user system and a security server. The user system includes a capture unit, an input unit, a sensor, an imaging unit and a home server. The home server accepts the user's instructions and configure monitoring program realized by the home server. The user may specify logical connections between imaging unit and sensor, notification rule when the alarm is occurred.

U.S. Pat. No. 6,970,183 describes a comprehensive, wireless multimedia surveillance and monitoring system provides a combination of megapixel digital camera capability with full motion video surveillance with a network, including network components and appliances such as wiring, workstations, and servers with the option of geographical distribution with various wide area carriers.

U.S. Pat. No. 6,850,601 describes a security detection system includes a detection unit capable of detecting a condition, said unit in communication with a remote central server. Where the detection unit is connected to the server via a dial-up modem, the detection system may be connected to a telephone seizure unit. Upon occurrence and detection of a condition, the detection unit prevents a telephone from communicating with a main telephone line, while still allowing said detection unit to communicate electronic information to the server, even upon lifting of the telephone receiver from the base. Once electronic information is sent to the server, a programmed database of the server may send the information according to a pre-determined designation. The server monitors whether a designated party has responded to the information, and if not, may send the information to a human monitoring station. The designated party may request and receive additional information from the detection unit, via the server.

United States Patent Application No. 20050271250 describes a method that determines whether a detected event is a significant event requiring action in a video surveillance system. Determined event attributes and object attributes are analyzed to determine if the potential event should trigger an action by the surveillance system. If the potential event should trigger an action, at least one action is triggered. Actions may include relevant event attribute and object attribute information. Potential event may include events detected by a sensor, or external events communicated by an external system to the surveillance system. Event attributes may include location and type of the potential event. Object attributes may include an identification of an object, and attributes associated with the identified object. If an object cannot be positively identified, object attributes may include potential object identifications or determined group associations of the object.

United States Patent Application No. 20050151640 describes a method for transferring data may include receiving data from a monitoring device, determining whether the subject being monitored has a condition that may require attention, and sending a notification message to a portable electronic device that is designed to be carried by a caregiver if such a condition exists. The notification message may be sent using one or both of a first wireless data transfer method and a second wireless data transfer method. The system may use both methods to communicate with one device or may use the first method to communicate with a first device and the second method to communicate with a second device. The portable electronic device may include two wireless transceivers such as a transceiver designed to connect the device to a local area network of a facility and a transceiver designed to connect the device to a cellular network.

United States Patent Application No. 20030025599 describes a method for identifying the occurrence of an event at a remote location, prioritizing the event, and then, based on the priority, forwarding the event to selected stations on a network incorporates a scheme for tagging the event with the location, type and priority of event at the point where a sensor picks up the event. Event data is then forwarded only to selected stations on the network as required by a priority hierarchy. This permits a large amount of data to be collected at the site of a sensor while minimizing transmission of the data to an as-needed basis, reducing the overall bandwidth requirements of the system. In one aspect, legacy device signals, appliance signals and video and still image data generated at a remote location includes is collected on a preselected basis for defining and transmitting an original condition to the remote location. Subsequent data is compared to the data representing the original condition. The transmitted data may be tagged with unique identifying components. The transmitted data is stored for archival, search and retrieval. A notification signal may also be generated and based on prioritization may be forwarded to selected recipients. Notification is also visually indicated on map and other graphic display monitors.

In each of these prior art notification systems, the conventional systems do not have the concept of a "session"; they do not detect the occurrence of an event for which a session is considered stopped or started; they do not detect an event for which a notification should be sent; they do not maintain a list of interested parties, nor do they send a notification to each party on the list of interested parties upon the occurrence of the event, given each party's specific list of notification configuration options.

Thus, a computer-implemented system and method for notifying users upon the occurrence of an event is needed.

BRIEF DESCRIPTION OF THE DRAWINGS

Embodiments are illustrated by way of example and not limitation in the figures of the accompanying drawings, in which FIGS. 1-3 illustrate a prior art camera-enabled cellular telephone.

DETAILED DESCRIPTION

A computer-implemented system and method for notifying users upon the occurrence of an event is disclosed. In the following description, numerous specific details are set forth. However, it is understood that embodiments of the invention may be practiced without these specific details. In other instances, well-known processes, structures and techniques have not been shown in detail in order not to obscure the understanding of this description.

Figure 3:
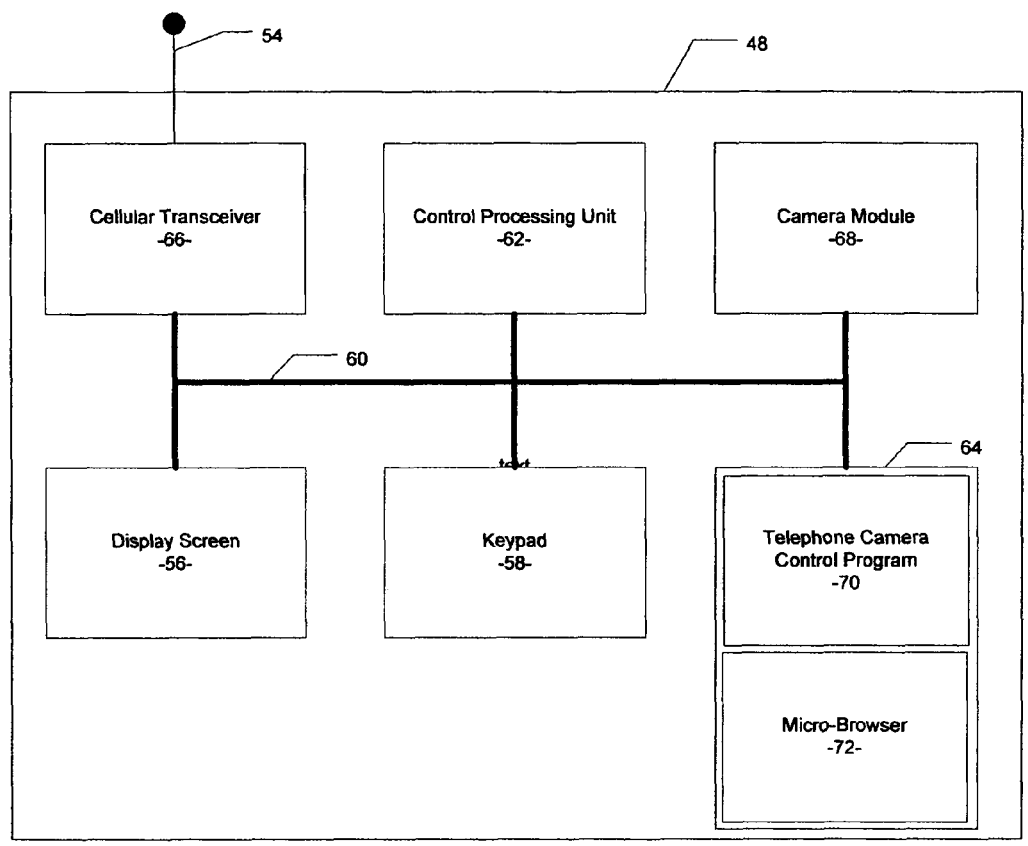

Referring to FIGS. 1-3, a prior art camera-enabled cellular telephone 48 is illustrated. The top end of the combined unit 48 typically includes a lens 50 and an antenna 54. Although not used much in camera phones today, one embodiment may also have a flip up flash unit 52. The front face of unit 48 is typically provided with a liquid crystal or plasma display screen 56 and a telephone keypad 58, both of which are electrically coupled to an internal bus 60 (as shown in FIG. 3). Referring to FIG. 3, camera-enabled telephone 48 includes a cellular transceiver component 66, a control processing unit 62, a camera module 68, a display screen 56, a keypad 58, and memory unit 64. Each of these components is interconnected via bus 60. Memory unit 64 can be used to store an application software component or telephone/camera control program 70 used to control the basic conventional features of camera-enabled telephone 48. In operation, a user can activate a shutter button (not shown) to capture an image through camera module 68 and send the image to a remote receiver via cellular transceiver 66. Prior art cellular telephones can also be used to establish a wireless Internet connection using a micro browser 72 stored in memory unit 64. In this manner, a user of prior art camera-enabled cellular telephone 48 can also manually capture images and transfer the images wirelessly to a remote user or to a webpage via the Internet.

Hand held or battery-operated products such as cellular/mobile phones, two-way pagers, personal digital assistants (PDA's), and personal organizers can communicate with other devices or servers by way of a wireless link. In one implementation, the Java programming environment developed by Sun Microsystems™ Inc. enables software developers to write device-independent wireless applications for accessing, downloading, or updating information over the wireless link. Sun™ provides a Java™ 2 Platform, Micro Edition (J2ME) that can be used with a Mobile Media API (MMAPI). The MMAPI extends the functionality of the J2ME platform by providing audio, video and other time-based multimedia support to resource-constrained mobile devices. MMAPI allows Java developers to gain access to native multimedia services available on a given device. Nevertheless, it will be apparent to those of ordinary skill in the art that embodiments can be developed without using a Java™ platform. Other programming paradigms (other than Java) include: Microsoft Windows Mobile, Symbian, Qualcomm's BREW, and Palm's PalmOS.

Embodiments leverage these prior art technologies and extend the functional capabilities to provide a computer-implemented system and method for automatically capturing images with a camera-enabled mobile device and for uploading the images to a network server.

Figure 4:
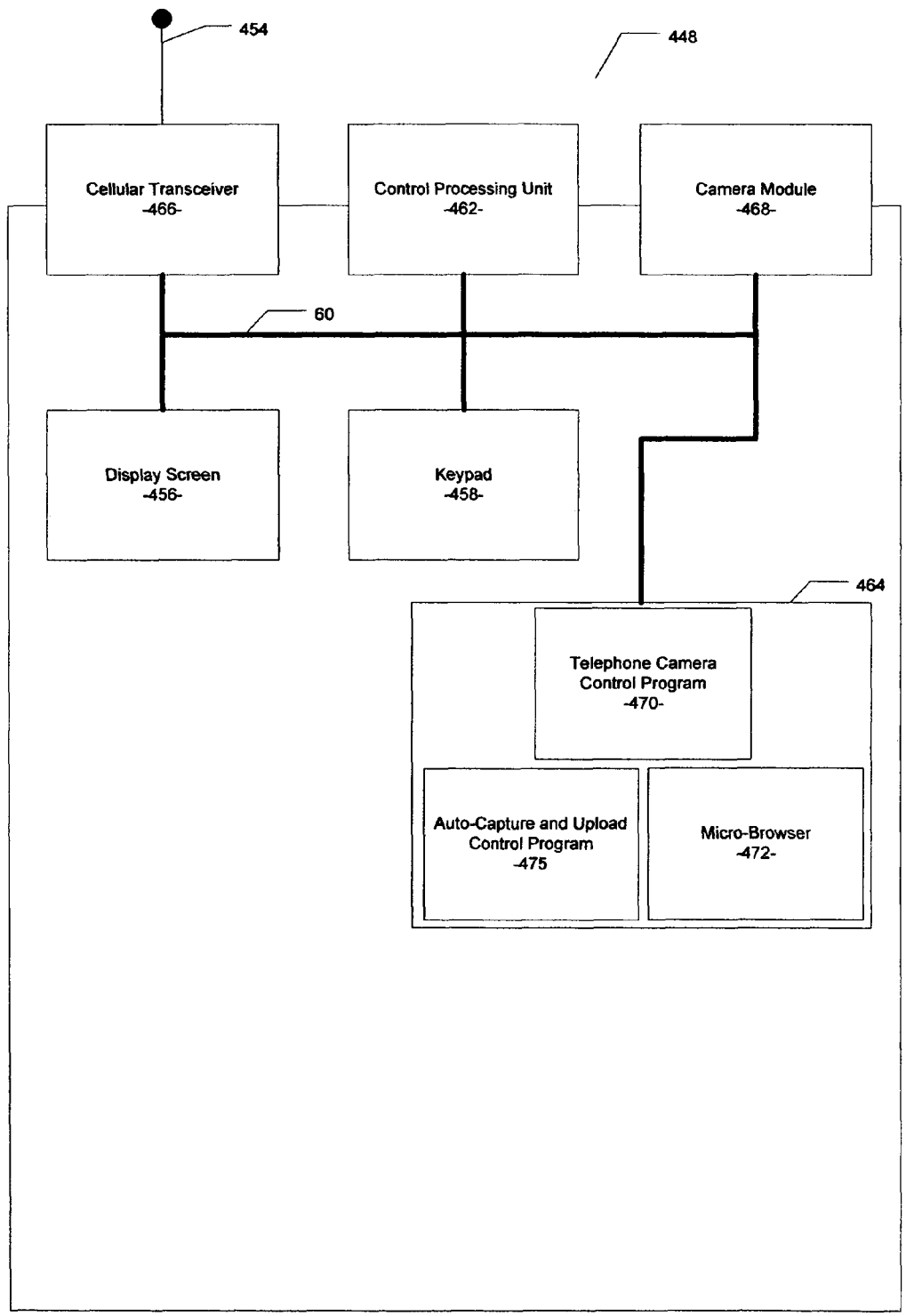
FIG. 4 illustrates a camera-enabled mobile device supporting the functionality of an embodiment.

Referring to FIG. 4, a camera-enabled mobile device 410 supporting the functionality of an embodiment is illustrated. As in a conventional camera-enabled mobile device, mobile device 410 includes a cellular transceiver 466, control processing unit 462, a camera module 468, a display screen 456, a keypad 458, and memory unit 464. Mobile device 410 includes a telephone camera control program 470 stored in memory unit 464. Control program 470 controls the basic conventional functions of device 410. Device 410 can also include micro browser 472 to enable a user of mobile device 410 to access the Internet via a wireless connection.

In one embodiment, mobile device 410 also includes an auto capture and upload control program 475. Control program 475 includes executable software and related data for implementing and controlling various features of an embodiment, as will be described in more detail below. Control program 475 can be fetched and executed by control processing unit 462 via bus 460.

Figure 5:
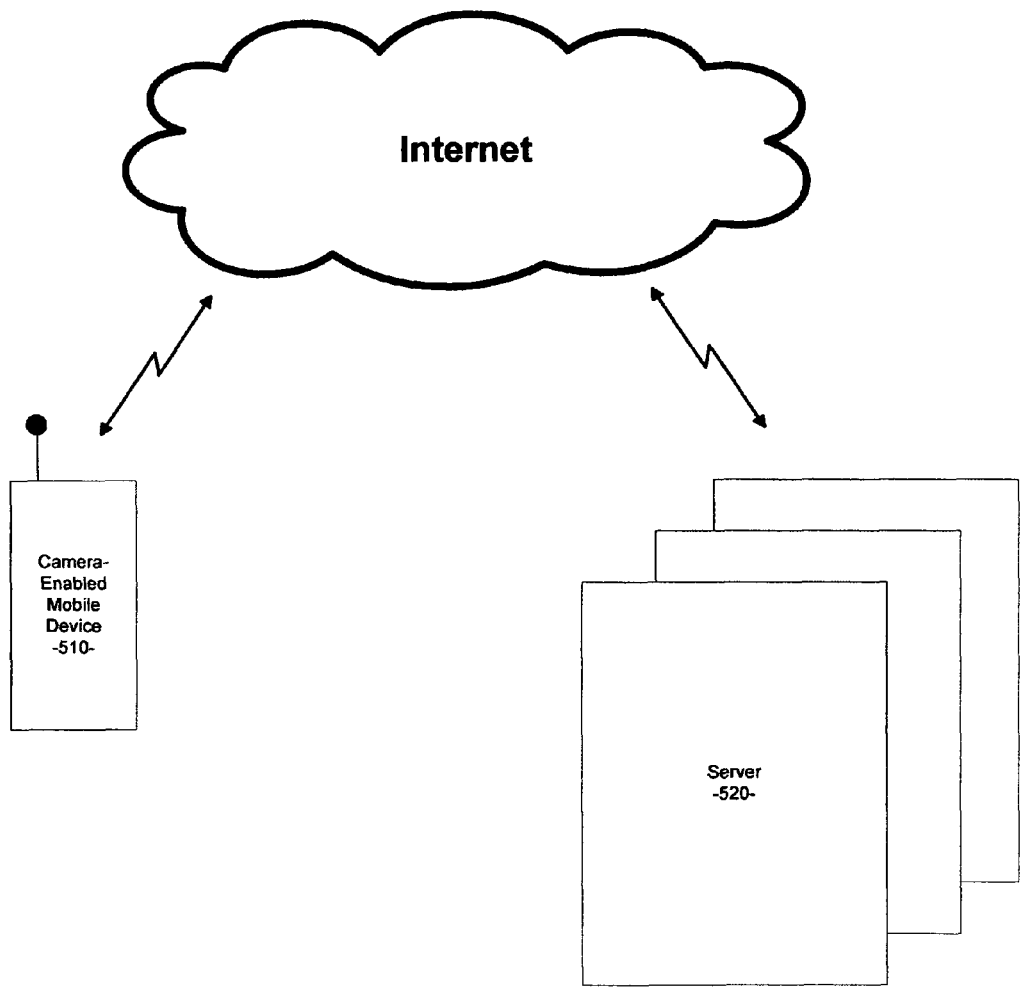
FIG. 5 illustrates a system architecture for uploading images to one or more servers via the Internet.

Embodiments provide a network-based system and service using software that executes partly on camera-enabled mobile devices and partly on a server. Using an embodiment, a collection of images captured by the camera-enabled mobile device of an originating user (denoted herein as the subscriber) can be uploaded to a server and processed by the server for subsequent access and viewing by other authorized users (denoted herein as guests). Referring to FIG. 5, a camera-enabled mobile device 510 embodying the functionality of an embodiment can automatically capture one or more images using the camera of mobile device 510. The captured images can then be wirelessly transferred via the Internet to one or more load-balanced servers 520. Conventional interfaces and protocols exist for wirelessly transferring images to a server via the Internet. However, no conventional technologies provide a means for automatically capturing images with a camera-enabled mobile device and for uploading the images to a network server in the manner described and claimed herein. As will be described in more detail below, server 520 can process the set of uploaded images for viewing by other authorized users.

Figure 6:
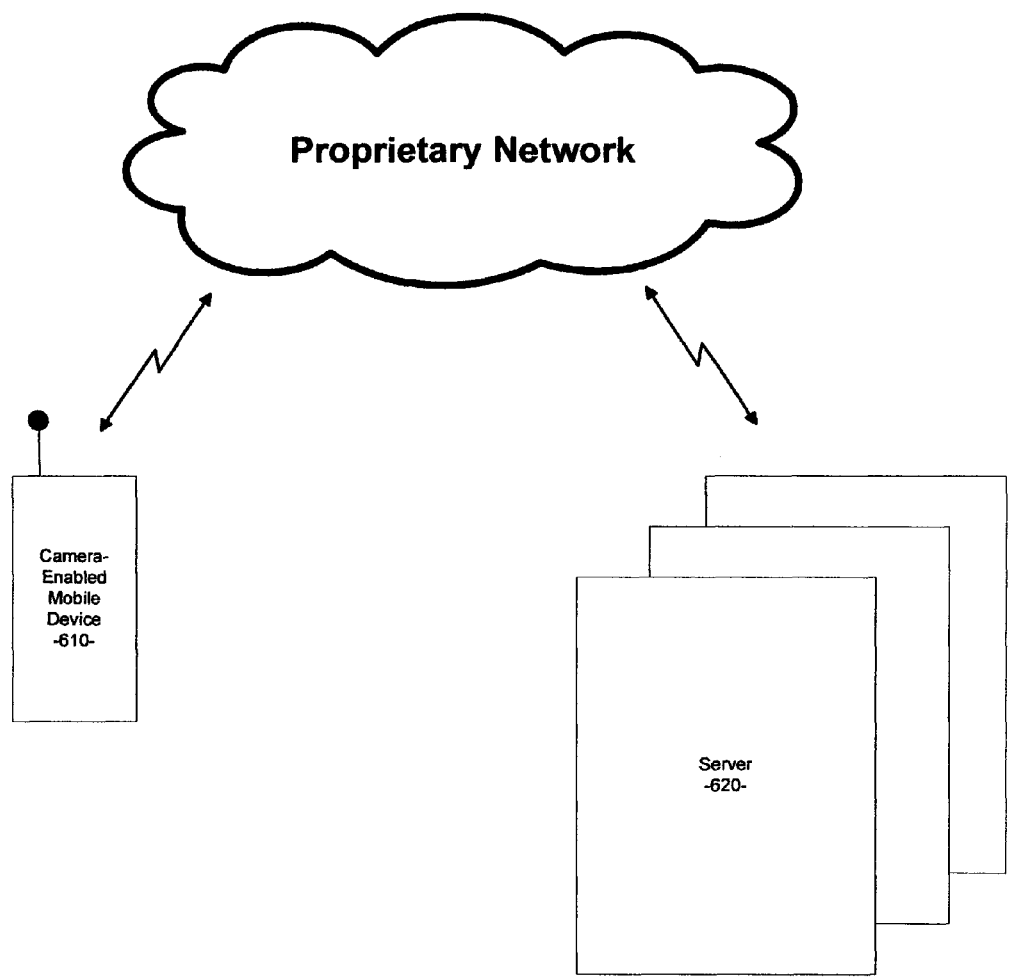
FIG. 6 illustrates a system architecture for uploading images to one or more servers via a proprietary network.

Referring to FIG. 6, it will be apparent to those of ordinary skill in the art that computer networks other than the Internet can be used for the transfer of images between camera-enabled mobile device 610 and server 620. Proprietary networks, peer-to-peer networks, or other networks can be used for the transfer of images between camera-enabled mobile device 610 and server 620.

Figure 7:
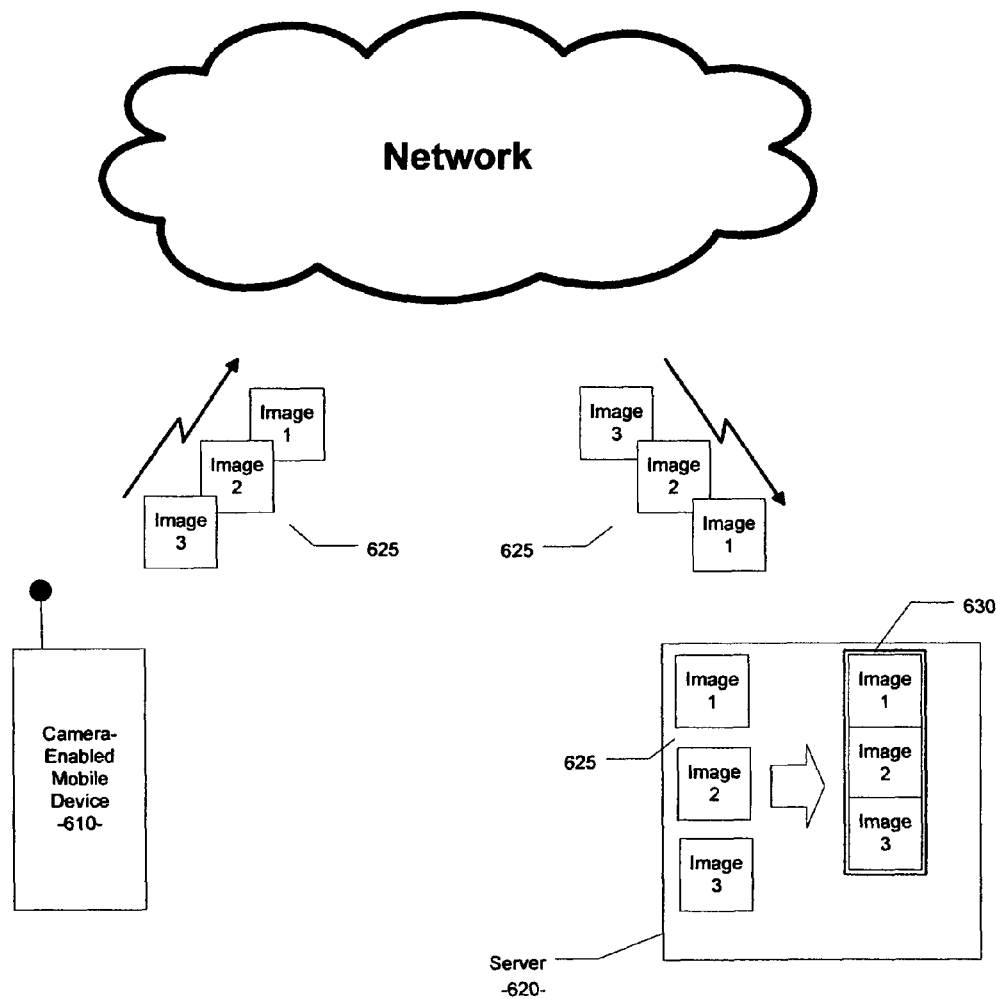
FIG. 7 illustrates the image upload operation of one embodiment.

Referring to FIG. 7, the image upload operation of one embodiment is illustrated. Using auto capture and upload control program 475 (shown in FIG. 4), a series of automatic snapshot images are captured by control program 475 through camera module 468. Note that no manual user activation of a shutter button on mobile device 610 is required. In one embodiment, the auto capture and upload control program 475 of an embodiment automatically captures images in the following manner. The subscriber typically places the camera-enabled mobile device in a tripod or other stable configuration (though not a requirement) and activates the auto capture and upload control program 475 in a conventional manner. The auto capture and upload control program 475 may begin by presenting a menu of options to the user (e.g. Configuration settings or help screens) or may, optionally, immediately begin snapping images (at a specified rate) and uploading the images to the network servers 620. The capture of an image is done under program control, typically by registering a request to the mobile device that the auto capture and upload control program 475 wants control of the camera. After this request is successfully satisfied, the auto capture and upload control program 475 of an embodiment makes requests to the device's operating system 470 for an image of a specific size, quality, and/or format According to a preconfigured time frequency parameter, mobile device 610 automatically captures snapshot images on a periodic basis. This series of images is depicted in FIG. 7 as images 625. Images 625 represent snapshots automatically taken by mobile device 610 at regular intervals. Again, other than an initial set up and configuration, no action is required by the user of mobile device 610 to capture images 625. Images 625 can be encoded in any of a variety of conventional image formats, including JPEG, TIFF, bitmap, PDF, etc. Once encoded, the images can be transferred to server 620 via a network. Server 620 receives the uploaded images 625 and stores the images in persistent server memory after performing all of the upload server processing steps described below.

In one embodiment, the conventional HTTP POST protocol is used to upload images from the mobile device to Internet-connected servers. This is one of a many ways that image content could be delivered to servers. Other alternative embodiments include (but are not limited to): SMTP (email), FTP (file transfer protocol), HTTP PUT method, or TCP/IP "sockets" combined with a custom/proprietary application-level protocol.

The HTTP POST approach has many benefits compared to other alternatives and was chosen for the preferred embodiment. FTP requires two connections for a transfer and thus is not efficient. FTP also requires FTP usernames and passwords to be managed and has no built-in way to embed meta data with the image (HTTP POST has this via HTTP HEADERS). SMTP is a store-and-forward protocol and thus images could arrive completely out of sequence or be very delayed. HTTP PUT is not well implemented and has security issues. Using low-level TCP/IP sockets suffers from difficulty of implementation on the mobile device, as many mobile operator networks are not designed or optimized for such traffic, which is the reverse case for HTTP POST.

A particularly novel element of an embodiment is the automated, rapid uploading of images versus the prior art of "streaming." Streaming refers to the isochronous (fixed rate) transmission of content in real-time. The approach used with images, in an embodiment, affords a number of interesting and valuable benefits. First, mobile operator networks are not isochronous, and the bandwidth available to the device varies widely. Uploading images does not require isochronous bandwidth and thus can be used in, literally, any mobile operator network environment. Secondly, uploading images without streaming uses much less bandwidth and hence has minimal impact on operator networks. Thirdly, using an embodiment, bi-directional communication can be implemented (e.g. VoiceOvers) because information can be tacked on the reply to each image. Streaming is mono-directional and must be stopped if information arrives "downstream" (versus "upstream"). Fourth, archiving images can be done more efficiently with an embodiment than streamed video content, as discrete units of information are available, versus N minutes of streamed video content. Fifth, with an embodiment, images can be easily extracted and emailed/distributed; because, the source content is an image, whereas extracting images from a video stream is a much more complicated process. Sixth, with an embodiment, adding a layer to an image (e.g. a time stamp, or motion indicator) is an easy and efficient task, whereas adding a layer, in real-time, to a video stream is difficult and time-consuming. Seventh, for users that want to view the content on mobile devices, rate-matching and buffering for video is either very complicated or intractable (i.e. it forces the lowest common denominator across all devices). With images in an embodiment, the content can be delivered to each user and varying rates without any additional overhead or loss of resolution.

In the event the subscriber wants to stop the automated capture and upload process, the subscriber can click on a "stop" button. However, termination of any existing upload must occur gracefully, meaning that no partial images are saved on the server as this would be undesirable behavior. Hence, upon each stop request, the software must wait until the current upload has completed. Then the software can terminate the existing cycle. The waiting period for the upload to terminate must be bounded by a maximum time limit to handle network errors.

In one embodiment, the process of uploading images upon command by the user can include several detailed steps. The following is a description of some of the low level steps performed in one embodiment to capture and upload an image.

1. Retrieve the preference for image quality
2. Retrieve the preference for image size
3. Retrieve the preference for upload frequency/snap delays
4. Retrieve the URL upload location and related password
5. Retrieve the preference for camera number
6. Retrieve the VoiceOver repeat count
7. Retrieve "advanced image options" (see below)
8. Display current "view of camera" for user
9. Snap the current picture (with possible delay on the first snap to allow camera settle time), with the appropriate image quality/size settings. This starts the "Snap Loop" (referenced below).
10. Construct the POST buffer:
    a. User-Agent must be set to an uppercase unique name to identify this type of client and creator. The format of the unique name is "PLATFORM-VENDOR", e.g. "BREW-ACME" or "JAVA-JOHNDOE". If the User- Agent cannot be set via the device/software platform, then the following HTTP header should be included:
1. "X-WHDC-USERAGENT: <identifier>"
b. Content-Length can be ignored; it is recommended to not include Content-Length because any mismatch in the value specified with the data sent may cause the server (e.g. Apache) to hang and ultimately timeout.
c. Add the password header
d. Add the rate header:
e. If this device cannot play an audio file from a URL (and it can play audio binary data from a buffer), then a header should be added to indicate the ability to play from a buffer.
f. Set the request URL to include an ID, a camera number, and an audio type.
g. As the body of the POST, the binary data of the JPEG image should sent.
11. Get the current time in seconds or milliseconds. Save for use below.
12. Connect to the upload URL server/location and issue the POST. Update the display to indicate the user that a POST is occurring, and, ideally, what percent of the POST has completed. Provide an option for the user to CANCEL the POST. This should return the user to the main menu.
a. Check the POST reply and determine if audio file is referenced and play with relevant VoiceOver count if appropriate. If the body of the POST reply is "OK" then terminate connection and continue (below). If the body of the POST reply starts with 'A' then perform the following: retrieve the next 100 bytes which is a null-terminated URL containing a URL of a wav audio file. If the VoiceOver repeat count is >0, then play the audio file, setting volume to the maximum. Format is 8-bit, mono, 8 Khz, PCM U8. Set title of canvas/form to be "Retrieving VoiceOver". If VoiceOver repeat count is >1, repeat the audio play for the appropriate number of times.
13. Any response other than 'A' or 'OK' indicates an error occurred during upload. In this case, display an error for 3 seconds with a sound (if possible) and then continue (below).
14. Mark the end-time and subtract the previously mentioned start time timestamp. Calculate the bits per seconds for the upload and store in non-volatile memory to display on the Preferences screen.
15. Delay for the required time, subtracting from the delay time the time it took to play the audio (including all repeated instances). If there was audio. It is very possible that no delay may be necessary.
16. Continue the "Snap Loop" until the user hits the "Stop" button.
17. Calculate the start and end time of the upload and calculate the bits/second rate. Store this for use in upload as described above.

In one embodiment, an animation preprocessing operation is performed by server 620. As shown in FIG. 7, this animation process uses a set of individual images 625 and combines the individual images together to form an animation clip or video object 630 comprising a timed sequence of the images 625. The combination of individual images 625 into animation clip (or video object) 630 can be done in a variety of ways. In one embodiment, images 625 are reformatted and combined together in a sequence corresponding to a timestamp associated with each individual image. The timestamp can represent the time when the individual image was captured or when the image was received by server 620. One embodiment of the animation process is described below. Note that the process of simply converting JPEG images to a video is known in the prior art. However, the application of this process to a system wherein images are automatically captured and uploaded from camera-enabled mobile devices is novel and non-obvious.

In one embodiment, animation has two parts: automatic, and user-selected. "Automatic" means that the last N minutes of incoming images are automatically converted into a displayable video object (which in turn is automatically refreshed at a pre-defined rate, to keep the displayable video object current). The user configures how many prior N minutes of recent activity is desired, and with what video quality level and what pixel size (e.g. 320×240) the displayable video object is created. Note that in one embodiment, only motion-detected images or images that are pre-buffered and post-buffered motion-detected are included in this recent activity.

User-selected animations come from the user-selected activity timeline (as described in more detail below and illustrated in FIGS. 22 and 23) with a start time, duration, and quality. In one embodiment, the following animation processing steps are performed by server 620:
1. First, copy the relevant image files to temporary storage for the purposes of preparing for animation. Typically the image files are renamed to frame1, frame2, . . . frameN, etc.
2. Optionally, move any ancillary images from an advertisement, notice, or the like, if relevant, to the temporary storage. These ancillary images may have to be replicated to slow down the ancillary images if the ultimate video clip is very short. The ancillary images also must be resized to match the desired (typically user-selected) output size.
3. Renumber the pre-pended ancillary images and source (i.e. captured) images to be frame1 . . . frame N.
4. Optionally, resize all the images to the desired video object size.
5. Optionally, replicate images to simulate slow-motion or rate reduction.
6. Create a video object using a specific codec (e.g. Quicktime, Windows Media, MPEG, Motion JPEG, Macromedia Flash). Multiple codec's may be used to create multiple output types of the video object, simultaneously.
7. Make the resulting video object available to the relevant, authorized set of users (i.e. guests) and perform any other post-processing, book-keeping functions (e.g. digital rights management, expiration date maintenance, etc.).

In one embodiment, ancillary images, such as advertisements, notices, licenses, waivers, and the like, can be inserted into an animation. Ad insertion is used to enable the option of providing a "free" account and to generate revenue from accounts that otherwise would not generate revenue. The following describes an ancillary image insertion process in one embodiment.

Ads can appear at the beginning of video objects constructed as animations of uploaded images. Ad content is provided by an advertiser and would normally come in a video format (e.g. Quicktime). This format must be converted to images for use with an embodiment. In one embodiment, the processing performed for ad content is described below.
1. In a set of one time processing steps: convert the ad content to a series of images. Various conventional tools are available for accomplishing this.
2. Use a subset of the ad images (e.g. every $5^{th}$, $10^{th}$, etc.) to avoid creating a resulting video file that is overly large.

3. Save the ad images in persistent storage with a given size (e.g. 320×240)
4. Wait for a request to generate an ad for a clip.
5. In a set of processing steps performed upon the upload of an image: Determine the required size for the ad image based on the size of the uploaded image. That is, if the user is uploading images at 176×144, the ad image must be 176×144 or the animation process may fail (images, uploaded and ad, must all be the same size).
6. See if the ad image has previously been converted to this size. If so, use these size-converted ad images. Otherwise, convert the ad images to the required size and save for future requests of the same size.
7. Determine the length of the video clip. If the video is very short, rate adjustment for the ad may be required to make the length of the ad commensurate with the length of the video clip.
8. Add the ad images to the collection of uploaded images used to create the video object.
9. Animate the entire series of uploaded images and ad images. A similar process can be used for any type of ancillary images that can be inserted into an animation.

In this manner, animation or video object 630 can be created by server 620 from a collection of two or more individual images as selected by a user. Further details on the user image selection process are provided below.

Figure 8:
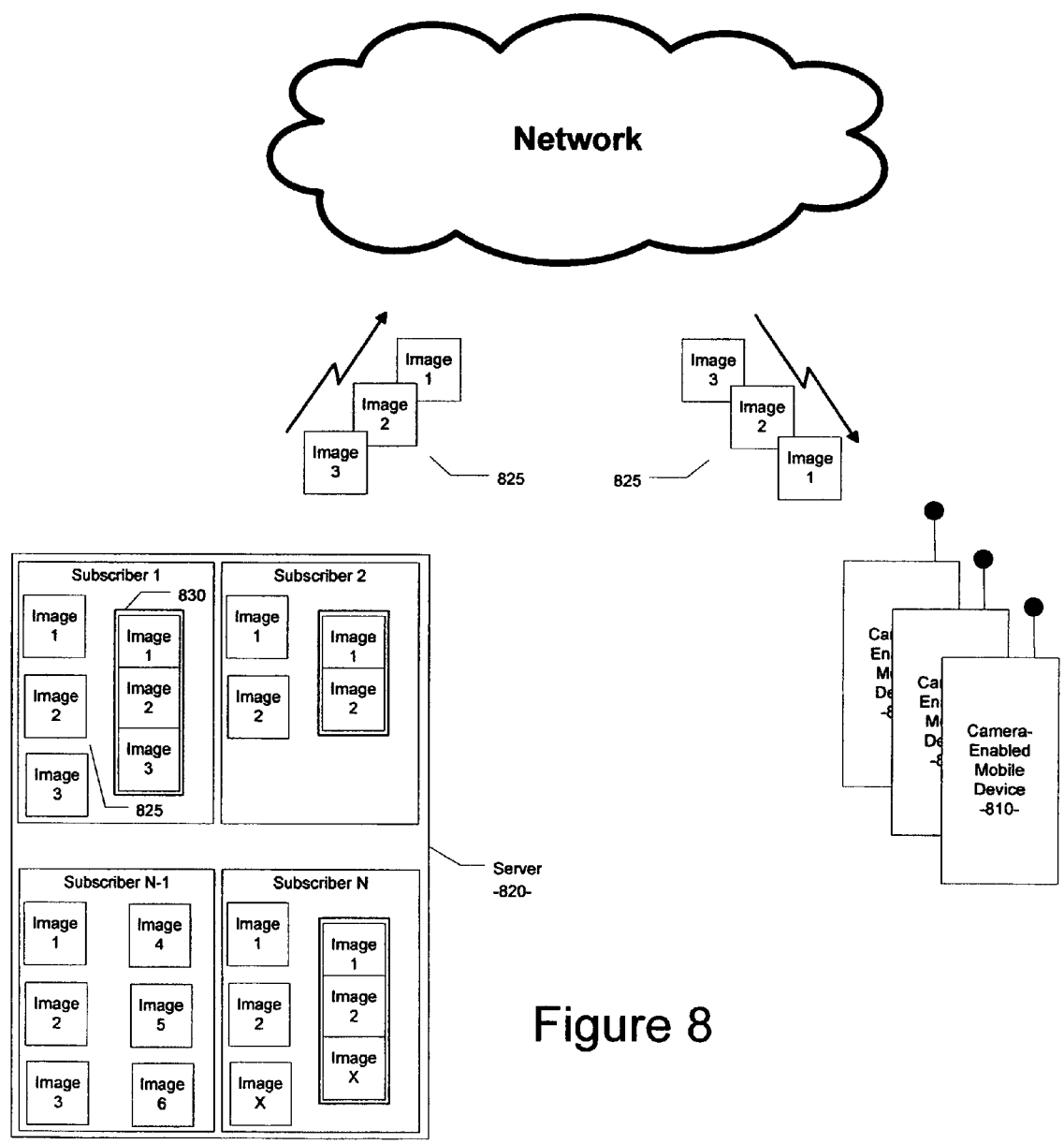
FIG. 8 illustrates one embodiment of the image download process of an embodiment.

Referring to FIG. 8, the image download process of an embodiment is illustrated. Using the image capture and upload process described above, server 820 retains a set of captured images in server 820 memory for each of a set of subscriber users. As used herein, the term subscriber corresponds to a user who has activated a camera-ready mobile device for the automatic capture and upload of images. In other words, the subscriber is a user who is creating and uploading images to server 820. Using techniques described above, a subscriber user or subscriber creates an account on server 820. As part of the created account, the subscriber receives access to a portion of server 820 memory for the storage of uploaded images. Thus, as shown by example in FIG. 8, server 820 retains a collection of captured and uploaded images for each of a plurality of subscribers in memory storage areas allocated for each subscriber. As will be described in more detail below, the subscriber can make his or her collection of images and/or animations resident in server 820, accessible and viewable by other authorized users (denoted herein as guest users or guests) via a network connection. As shown in FIG. 8, an authorized user of a mobile device 810 (i.e. a guest) or an authorized user of any viewing device (see FIG. 10) can select one or more images 825 and/or animations 830 for download from a particular subscriber's image collection. The selected images 825 and/or animations 830 are transferred to the requesting guest's authorized mobile device 810 or other viewing device 1030 via the network.

Figure 9:
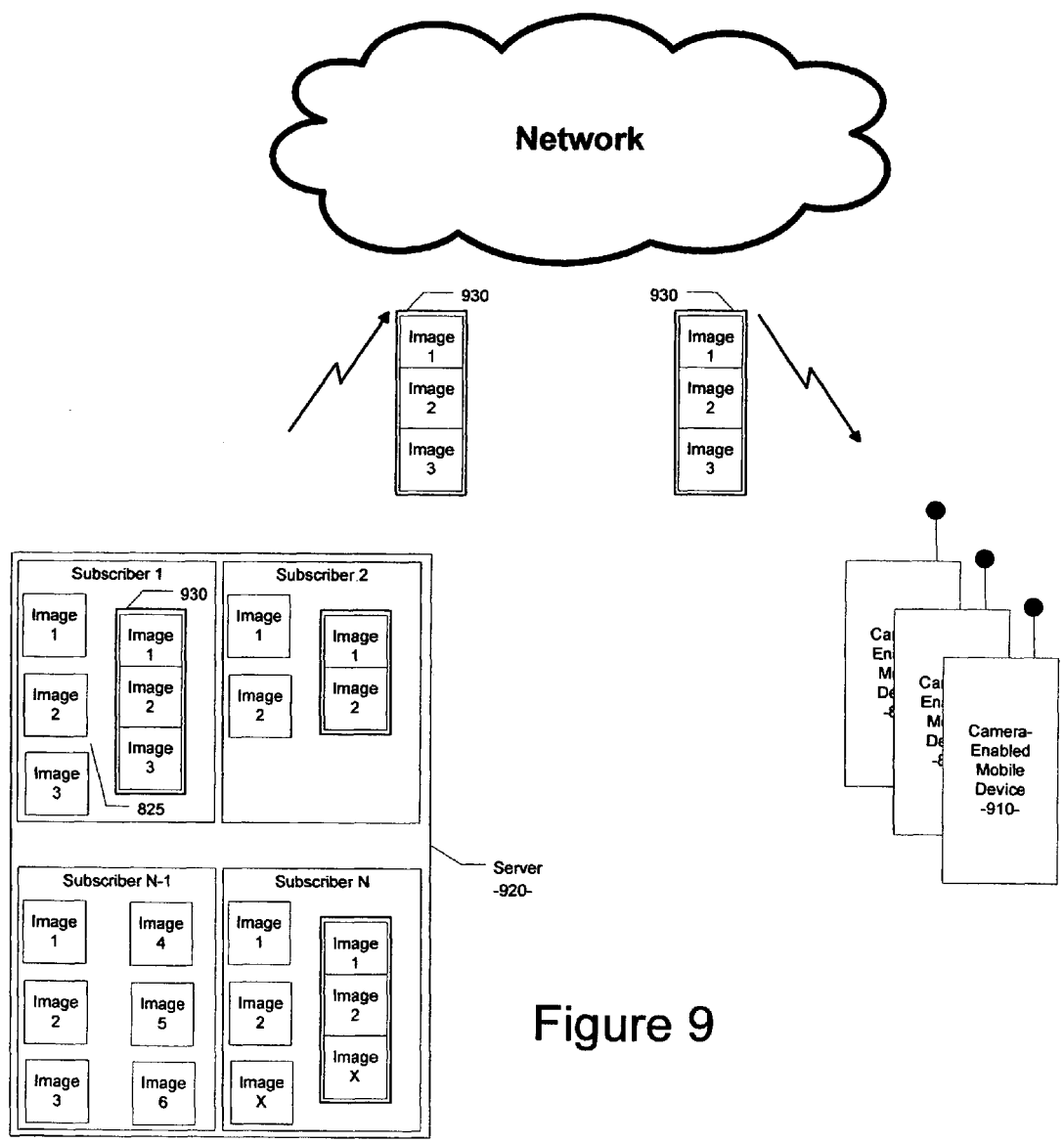
FIG. 9 illustrates one embodiment of the image download process of an embodiment for use with animations.

Referring to FIG. 9, a similar process is used to download video or animation objects 930 from a selected subscriber image collection (i.e. library) to an authorized guest 910 via the network. As will be described in more detail below, an authorized guest (or subscriber) can configure and activate the creation of a unique video or animation object from two or more images in a given subscriber's image collection. Using the activity timeline user interface described in more detail below, the authorized guest specifies a point on the activity timeline. Images in a given subscriber's collection corresponding to the specified point in time are assembled by server at 920 into a video or animation object and delivered to the requesting authorized guest via the network. In this manner, authorized guests have convenient access to one or more images or on-the-fly created video or animation objects of a specified subscriber.

Figure 10:
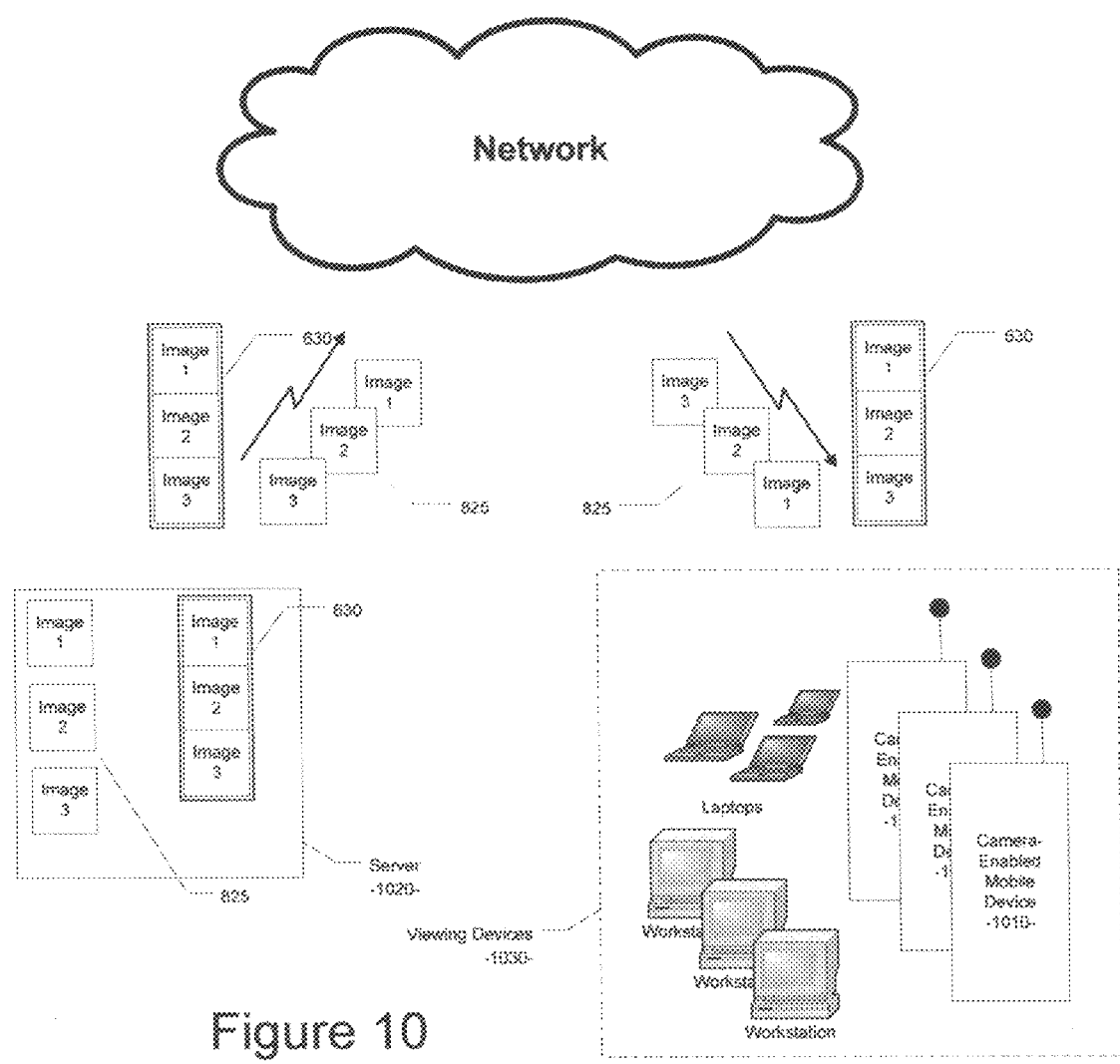
FIG. 10 illustrates one embodiment of the image download process of an embodiment for use with various client devices.

Referring to FIG. 10, subscriber images and corresponding animations are retained by server 1020 as described above. These images and animations can be delivered to authorized guests via the network. As shown in FIG. 10, authorized guests can be using a variety of viewing devices 1030. These viewing devices 1030 can include camera-enabled mobile devices 1010, laptop computers, workstation computers, personal digital assistants, or other network connectable viewing devices.

Figure 11:
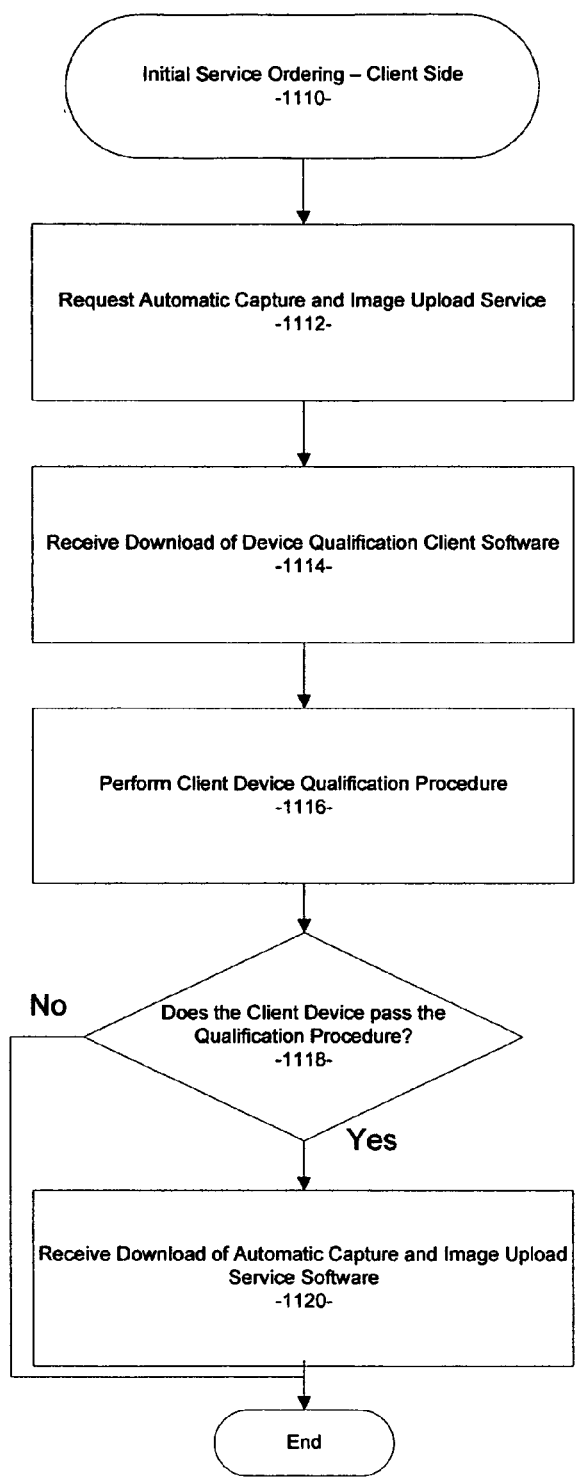
FIG. 11 is a flow diagram illustrating processing for initial service ordering.
Figure 12:
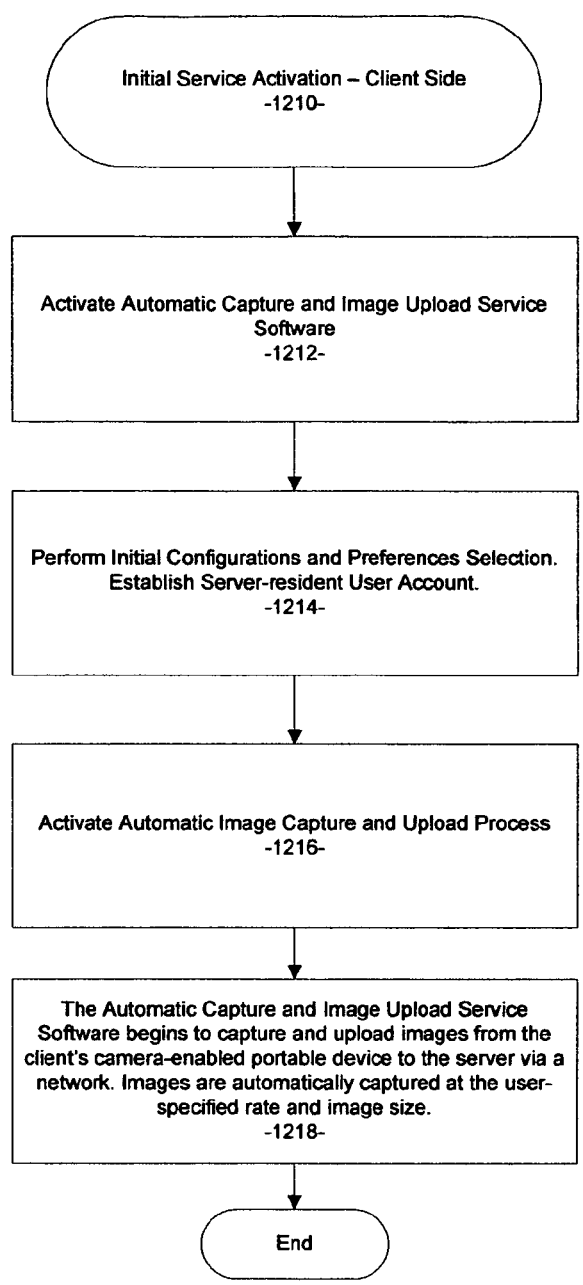
FIG. 12 is a flow diagram illustrating processing for initial service activation, client side.

Referring to FIGS. 11-21, processing flow diagrams illustrate some of the basic processes performed by or with an embodiment. Referring to FIG. 11, the initial service ordering steps from the client side perspective are illustrated. In processing block 1112, a client device user can request the automatic capture and image upload service provided by an embodiment. Using a conventional web site or an e-mail link, the upload service of an embodiment can be made available to a client user. Upon user activation of a link or soft button, the user receives a download of device qualification client software in block 1114. The device qualification client software is used to determine if the client device can support the automatic capture and image upload functions. This client device qualification procedure is executed on the client device in processing block 1116. If the client device cannot support the automatic capture and image upload functions, execution terminates at the End bubble. If the client device will support the automatic capture and image upload functions, the automatic capture and image upload service software is downloaded to and received by the client device in processing block 1120. Referring to FIG. 12, the initial service activation steps from the client perspective are illustrated (block 1210). Once the automatic capture and image upload service software has been downloaded to the client device (block 1120), this software is activated by the client user in block 1212. In block 1214, the user can use the automatic capture and image upload service software to perform initial configurations and preference selection. With the appropriate authorization, the user can edit preferences on the server or preferences on the client device. In one embodiment, these server preferences include one or more of the following: device/camera title, time zone, date/time stamp (with location and font), thumbnail dimensions, matrix view columns and image sizes, motion detection options, recent activity window timeframe (number of recent minutes to show), quality setting for recent activity window, size of recent activity window, default size/quality for activity timeline animations, location of date/time stamp, font of date/time stamp, crop region, live window dimensions, rotation parameters, monochrome conversion parameters, contrast adjustment, voiceover compression level, enable/disable Web access for live images, access control via HTTP_REFERER or QUERY_STRING, and language selection. In one embodiment, these client device preferences include one or more of the following: Language preference (e.g. French, English, etc) (preferably auto detected, but could be an explicit preference), Delay between snapshots, Image quality (low/medium/high, 1-100), Image size (e.g. 320×240), VoiceOver count (number of times to repeat received message, 0=disable/mute capability), Autostart or not (immediately begin automatic image capture upon start of program, or alternatively go to main menu for configuration etc), Virtual Camera number (if the user has multiple accounts), flash on/off, zoom level, shutter sound, start/stop time of capture, maximum # of images, maximum total of bytes uploaded, allow interruption from phone call, etc.

Some additional preference processing steps of one embodiment are set forth below.

1. Provide numeric-only input option for "Snap Delay" (in seconds).
2. Provide numeric-only input option for VoiceOver count. Can be free-format or drop-down. Range value is 0-5.
3. Provide drop-down numeric input option for "Camera Number". Range is 1-10.1 is the default.
4. Provide drop-down option for image size. If the list can be enumerated from the device, then fully populate. Otherwise, provide 160×120, 176×144, 240×180, 320×240, and 640×480. If error occurs on snap with the specified size, use fallback algorithm to guarantee some image is snapped.
5. Provide drop-down option for image quality. If the list can be enumerated from the device, then fully populate. Otherwise, provide Low, Medium, High, and Maximum. If error occurs on snap with the specified quality, use fallback algorithm to guarantee some image is snapped.
6. If the device provides additional options (such as flash, shutter sound, etc.) then provide options for these. These are called "advanced image options."
7. Add option for "Auto Start". If set, instead of displaying the menu upon invocation, the software should just begin automatic uploading.
8. Display the bits per second for the most recent transfer.
9. Allow option to save preferences or cancel (and don't save).

It will be apparent to one of ordinary skill that other parameters for particular embodiments can be defined and configurable. Referring still to processing block 1214, the client user can establish a user account, which is maintained by the image server. As part of establishing a user account, the server allocates a portion of persistent server memory for the storage of images and or animations captured by the client user and uploaded to the server. In processing block 1216, the client user can activate the automatic image capture and upload process of an embodiment. Activation of this function by the client user initiates the automatic capture of images at a user defined frequency using the camera of the client mobile device. In block 1218, the automatic capture and image upload service software on the client device begins to capture and upload images from the client's camera-enabled portable device to the server via the network. Using the previously set preferences and configuration parameters, the images are automatically captured at the user specified rate, with the user specified image size, and in the user specified format for upload to and storage by the server.

Figure 13:
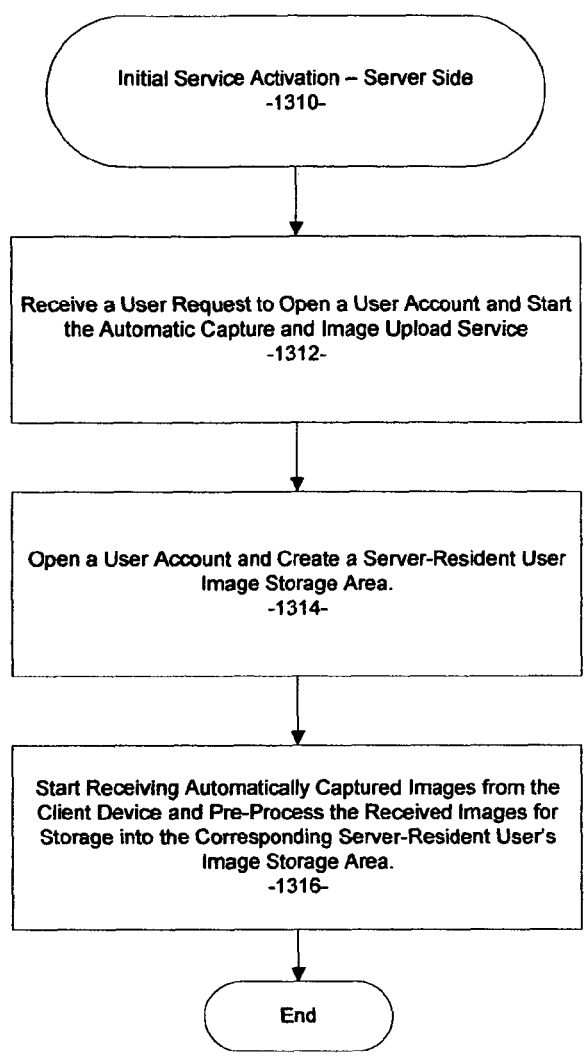
FIG. 13 is a flow diagram illustrating processing for initial service activation, server side.

Referring to FIG. 13, the initial service activation from the server side perspective is illustrated. In block 1312, the server receives a user request to open a user account and start the automatic capture and image upload service. As part of the user account creation, the server allocates a portion of persistent server memory for the storage of images and animations captured by the particular user (block 1314). The server also retains information related to the user. In block 1316, the server starts receiving automatically captured images from the client device and begins the preprocessing of the received images for storage into the corresponding server resident user's image storage area. The preprocessing of the received images performed by the server is described in more detail in FIG. 14.

Figure 14:
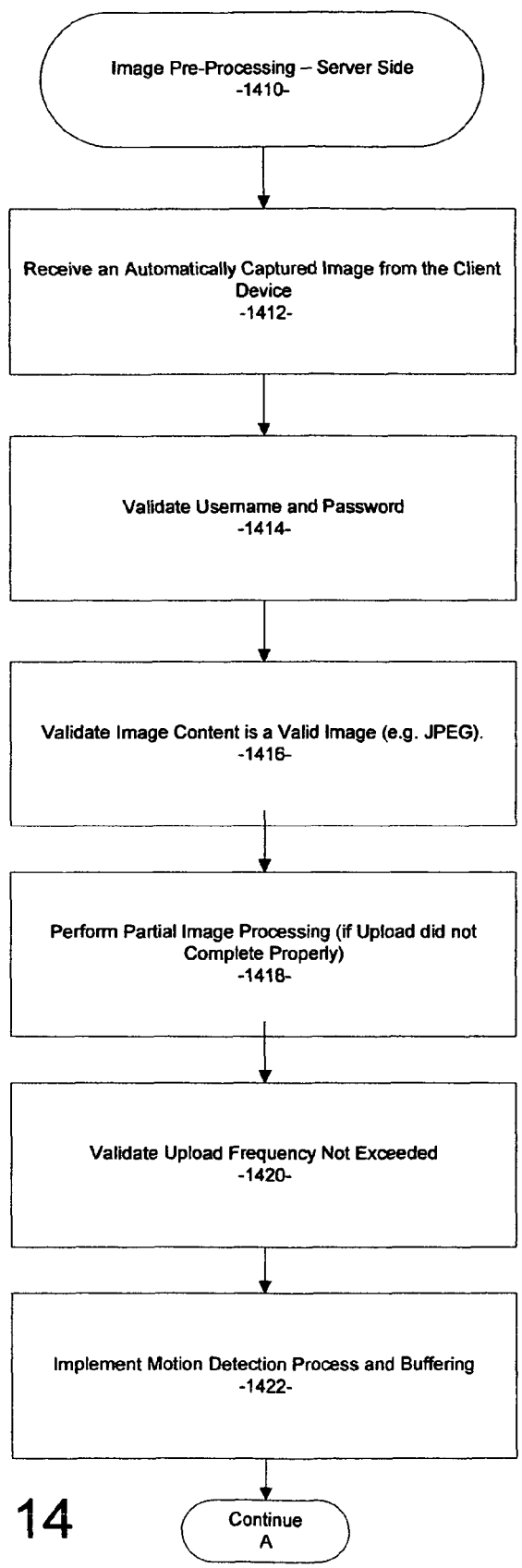
FIGS. 14-15 are flow diagrams illustrating image pre-processing.

Referring to FIG. 14, image preprocessing performed by the server upon receiving automatically captured images from a client device is illustrated. In block 1412, the server receives an automatically captured image from a client device. The image data packet sent by the client device includes user identification information and various image parameters. In block 1414, the server uses this information to validate the username and password of the user originating the image. In block 1416, the server validates that the image content is a valid image (e.g. the data/file is a JPEG formatted, or other image type formatted file). In block 1418, partial image processing is performed if the received image is incomplete or contains errant data. In block 1420, the server checks to determine if too many images from the particular client device have already been received. In other words, the server validates that the upload frequency for the client device has not been exceeded. In block 1422, a motion detection process and buffering process is applied to the received image. Using conventional techniques, a received image can be compared with previously received images to determine similarity of content. For example, if a camera position has not changed and the scene within the viewfinder of the camera has not changed, one would expect that two images captured by that camera would be exactly the same. In this case, one or more of the same captured images could be discarded to save storage space in server memory. Similarly, portions of captured images that have not changed from one captured image to the next can also be processed to optimize image storage space and processing time. Further, the changes between one captured image and the next can be used to signal motion detection in the captured images. The detection of motion in captured images can trigger other functionality of various embodiments. In one embodiment, the user can configure the level of motion detection sensitivity, and the amount of time before and after motion is detected that should be "buffered" for the purposes of giving a context to the saved images. The preprocessing operations performed by the server continue at the bubble A shown in FIG. 15.

Figure 15:
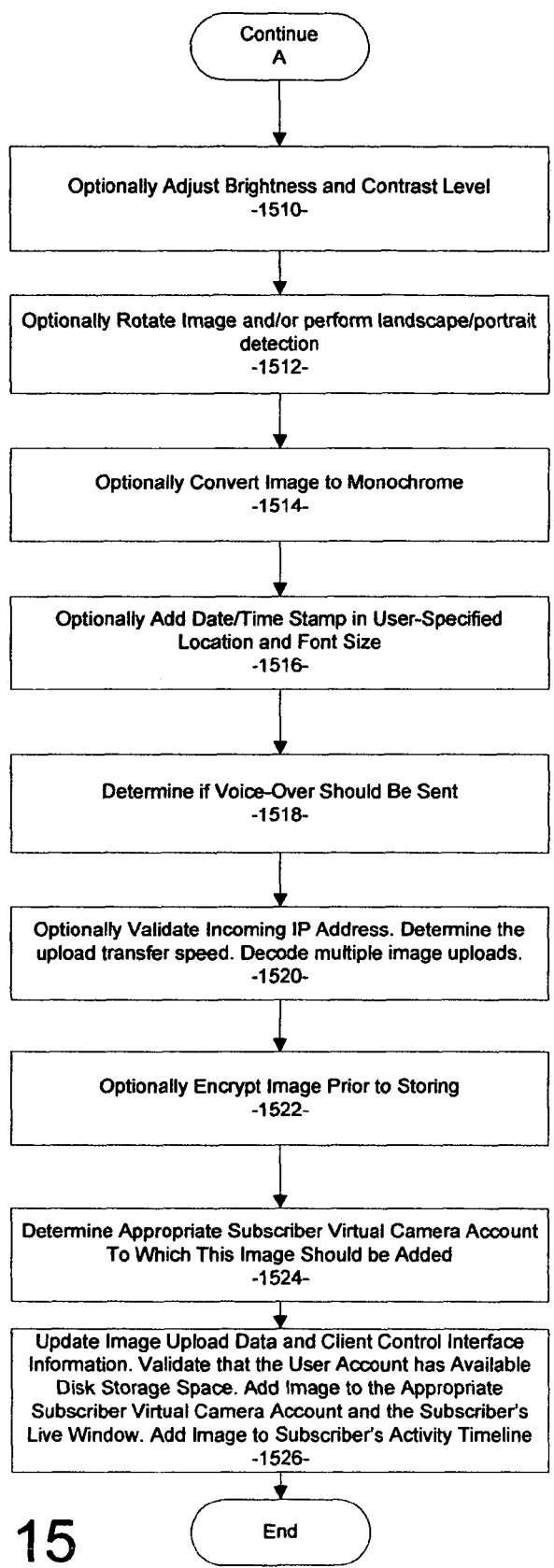

Referring to FIG. 15, the preprocessing operations performed by the server on an uploaded image continue at block 1510. In block 1510, the server uses the previously specified user preferences and configuration parameters to adjust the brightness and contrast level of the image (1510), optionally rotate the image (1512), optionally convert the image to monochrome (1514), optionally add a date/time stamp to the image in a user specified location and font size (1516), and to further adjust the uploaded image content. In addition, the server also automatically determines if the incoming image is configured in a landscape or portrait orientation. The client control interface (described below) is configured for the detected orientation. In block 1518, the server determines if a voiceover interaction request should be sent to the subscriber (i.e. the originator of the uploaded image) to establish a communication link between the subscriber and a guest viewing the subscriber's image collection. The voiceover functionality of an embodiment is described in more detail below in connection with FIG. 21.

Referring still to FIG. 15, at processing block 1520, the server optionally validates the IP address of the incoming captured image. In one embodiment, the server can dynamically determine who the mobile operator is for the uploaded image. Because the mobile operator identity cannot be reliably determined from the data sent from the mobile device (e.g. the identity can be faked, or the content is not presented in a standard way), a new way must be used to determine the mobile operator identity. In one embodiment, the following processing steps are used:

1. Check to see the last time the operator was checked. If the time has not been within the required time, then invoke the algorithm to detect the operator. This is done so that a time-intensive operation is not done for each upload.
2. Get the source IP address.
3. Do a "whois" lookup on the IP address. If the returned data contains an "org name, orgname, organization name" then use that value. If an organization name does not appear, then use the first line returned.

In this manner, the server can validate the source of the captured image. Also at processing block 1520, the server determines the upload transfer speed. For devices/networks that are not "buffered", mark the start and end time of the upload and then calculate the bit rate based on the number of bits transferred over the measured time. For networks or devices that are "buffered", the mobile device must maintain processing statistics and upload statistics for a prior transfer on the subsequent transfer. These statistics are then transferred to the server. In one embodiment, the upload transfer speed determination process used can be based on the type of client device and/or network over which the upload is taking place. The upload transfer speed can also be used for pricing the automatic image upload service of an embodiment. For example, faster upload speeds can be priced at higher values than slower upload speeds. Also at processing block 1520, the server can decode an upload request that contains multiple images. For example, some client devices have multiple cameras (e.g.—front/back). Other devices are "gateway" devices that gateway (i.e. aggregate) requests for multiple single-camera devices. In these cases, the server must process these multiple image uploads and decode the upload into single images. In block 1522, the server can optionally encrypt the received image prior to storing the image in server memory. Many conventional techniques are known for encrypting images. In block 1524, the server determines the appropriate subscriber virtual camera account to which the received image should be added. In the virtual camera feature of an embodiment has broad ramifications. The purpose of the virtual camera feature is to allow the subscriber to associate a particular subscriber account as the target of the current upload session. Subscribers in an embodiment can have multiple accounts, each with different guest lists and account properties. Each time a subscriber begins a session of capturing and uploading images from his/her camera-enabled mobile device, the subscriber can direct the images to a particular subscriber sub-account. This means that a single camera-enabled mobile device can be used to capture images for a different group of guests, by specifying the subscriber sub-account as a target account for the captured images associated for the desired group of guests. The virtual camera feature of an embodiment provides the ability to dynamically change the destination account for uploaded images. In this manner, an embodiment supports both professional and personal use and offers flexible privacy features.

Referring still to block 1526 shown in FIG. 15, the server adds a newly captured image, to the subscriber's live window and the appropriate virtual camera account. Prior to storing the captured image in the user account, the user account disk storage quota is checked. The image is not stored if the user account disk storage quota is exceeded. The server also retains the incoming image frequency so the server can configure the client browser to re-request the image upload at the appropriate rate. As will be described in more detail below, the subscriber and his/her guests can use a user interface provided by an embodiment for monitoring, controlling, and viewing the capture and upload of subscriber images. The subscriber's live window is one portion of this user interface. Another portion of this user interface is the activity timeline. The activity timeline defines a time over which images are periodically captured. As an image is captured and retained by the server, and the event is recorded on the activity timeline in block 1526.

Figure 16:
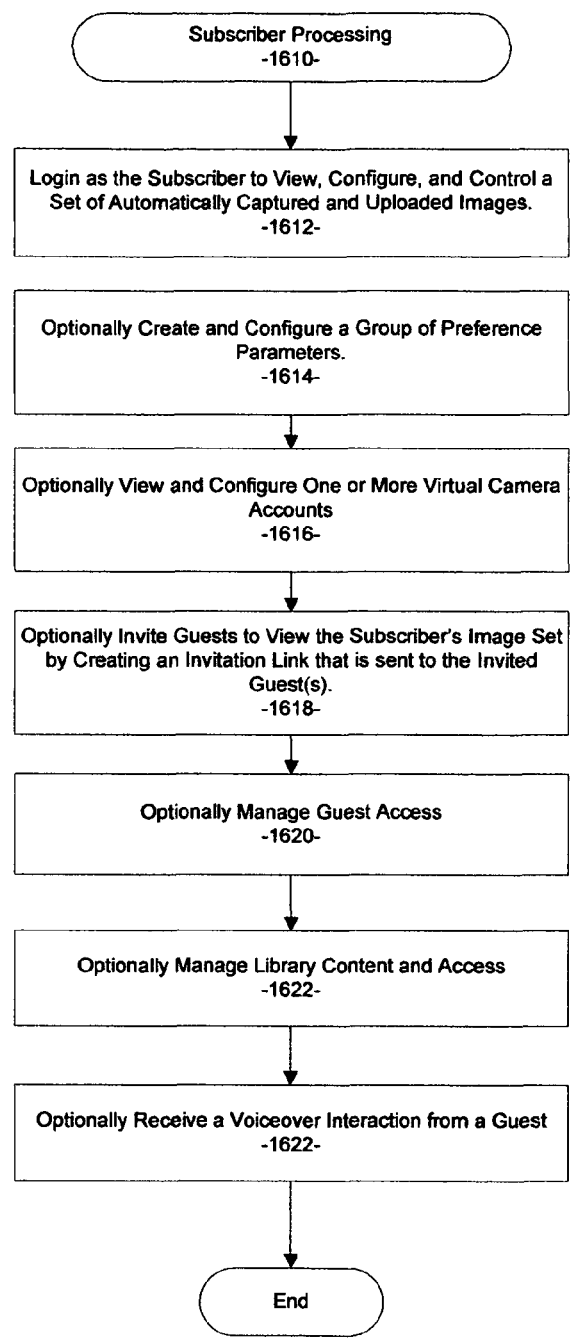
FIG. 16 is a flow diagram illustrating subscriber processing.

Referring to FIG. 16, basic subscriber processing steps are illustrated. In block 1612, the user can log in as a subscriber to view, configure, and control a set of automatically captured and uploaded images. In block 1614, the subscriber can optionally create and configure a group of preference parameters as described above. In block 1616, the subscriber can optionally view and configure one or more virtual camera accounts (i.e. subscriber sub-accounts) as described above. In block 1618, the subscriber may optionally invite guests to view the subscriber's image collection by creating an invitation link that is sent to the invite guest(s). An invitation link can be, for example, a hyperlink embedded in an e-mail that is sent to the invited guests. Invited guest processing is described in more detail in connection with FIG. 17. In block 1620, the subscriber can optionally manage guest access to his/her image collection. In block 1622, the subscriber can optionally manage the subscriber's library content and access thereto. Subscriber library access management processing is described in more detail below in connection with FIG. 19. In block 1622, a subscriber may optionally receive a voiceover interaction request from a guest. The voiceover function of an embodiment allows invited guests to interact with a subscriber, while the image capture and upload process is active. In one embodiment, the guest is allowed to activate a voiceover soft button as part of the guest's user interface. Upon activation of the voiceover button, the guest is allowed to record a brief, audible message or to use a text to speech engine to convert text to a computer-generated voice. The recorded audible message from the guest is then delivered to the subscriber upon the next image upload from the subscriber. Upon receiving the voiceover message from the guest (block 1622), the subscriber may play the message through the speaker of their client device. In one embodiment, and the voiceover audible message from the guest may have prepended to it an audio advertisement for the subscriber.

Figure 17:
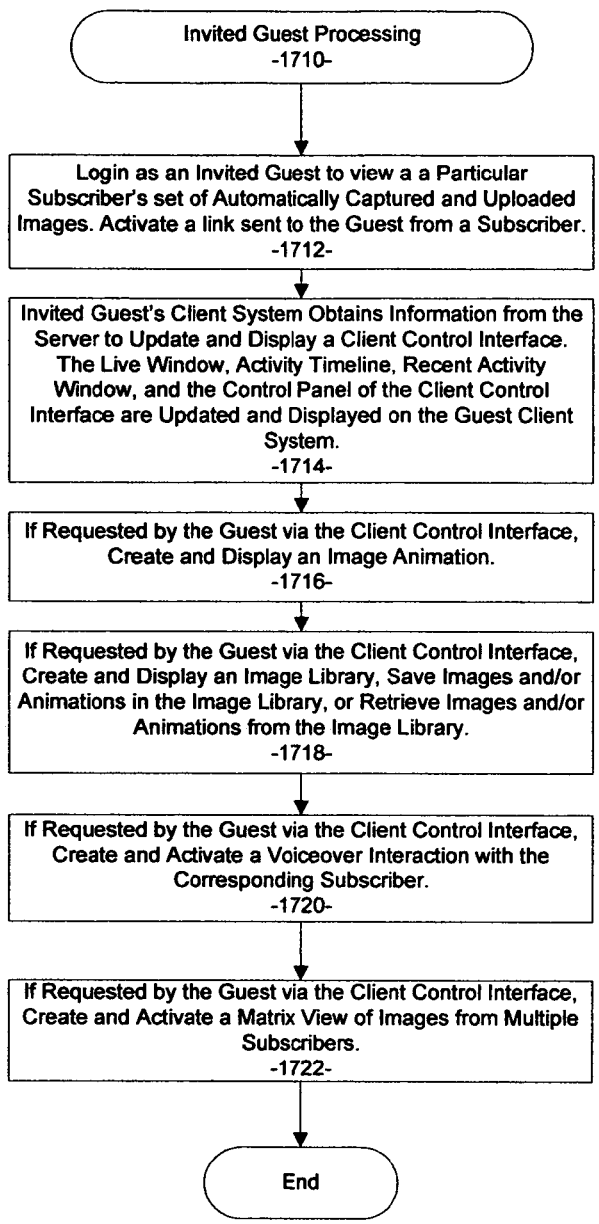
FIG. 17 is a flow diagram illustrating invited guest processing.

Referring to FIG. 17, invited guest processing is illustrated. As described herein, guests are users who wish to view a collection of images captured by a particular subscriber. In block 1712, a user can log in as an invited guest to obtain access to a particular subscriber's set of automatically captured and uploaded images. In one embodiment, a subscriber can give access to a guest by e-mailing to the guest an e-mail containing a link or a digital access key that the guest may use or activate to obtain authorization to access the subscriber's image collection. Once authorized, the invited guest may access a user interface of an embodiment, denoted the client control interface, with which the invited guest may view and manage access to the subscriber's image collection. As part of the client control interface, the server updates and displays a live window, and activity timeline, a recent activity window, and a control panel with which the invited guest may manage access to the subscriber's image collection (block 1714). Using the client control interface, the invited guests can view the subscriber's captured images. The activity timeline can be used to define which images the guest would like to view. Further, the guest can use the client control interface to command the creation and display of an image animation (block 1716). Image animation processing is described in more detail below in connection with FIG. 20. In block 1718, the invited guests can also use the client control interface to access a subscriber's image library. The invited guest may select a subscriber's image library, save images and/or animations in the image library, or retrieve images and/or animations from the subscriber's image library. The subscriber's library management functionality is described in more detail below in connection with FIG. 19. In block 1720, the invited guests can create and activate a voiceover interaction with the corresponding subscriber as described above. In block 1722, the invited guest can use the client control interface to create and activate a matrix view of images from multiple subscribers (see FIG. 24). The matrix view allows a guest to see multiple live automatic image broadcasts from multiple subscribers in one browser screen. All images from each of the corresponding subscribers automatically update at the predefined frequency as specified by the particular subscriber.

Figure 18:
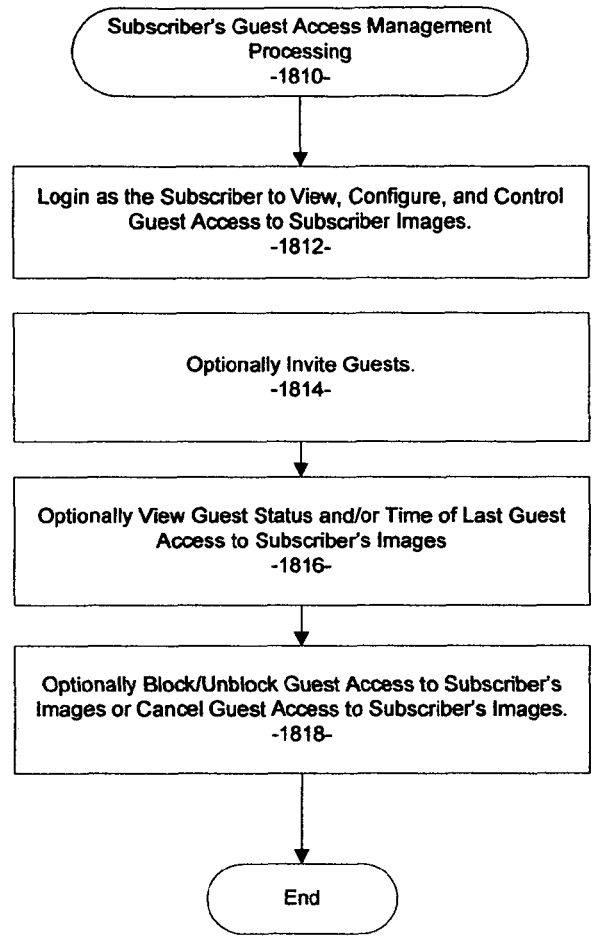
FIG. 18 is a flow diagram illustrating processing for subscriber guest access management.

Referring to FIG. 18, the subscriber's guest access management processing is illustrated. In block 1812, a user can log in as the subscriber to view, configure, and control guest access to that subscriber's images. The subscriber can use the client control interface to manage guest access. In block 1814, the subscriber can optionally invite guests as described above. In one embodiment, a subscriber may send an e-mail with an invitation link to a guest and request the guest to activate the link. The subscriber may also optionally view guest status and or view the time of the last guest access to the subscriber's images (1816). The subscriber may also optionally block or unblock guest access to the subscriber's images or cancel guest access to the subscriber's images (block 1818).

Figure 19:
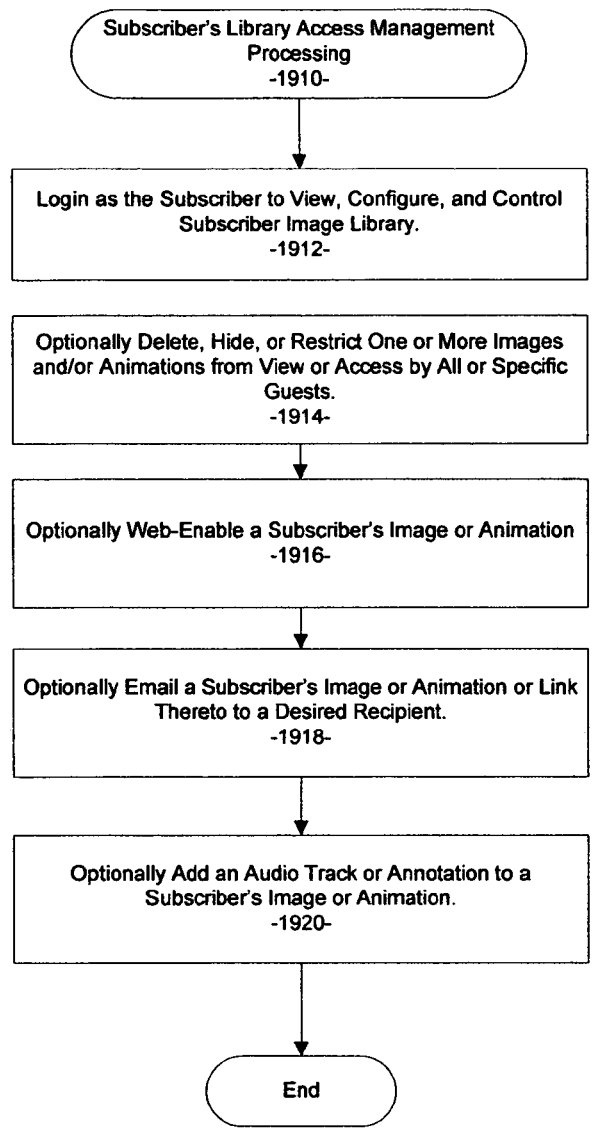
FIG. 19 is a flow diagram illustrating processing for subscriber library access management.

Referring to FIG. 19, the subscriber's library access management processing is illustrated. In block 1912, a user can log in as the subscriber to view, configure, and control the subscriber's image library. The subscriber can use the client control interface for this purpose. Each subscriber has their own library, where images and animations can be saved and shared. Guests can save animations to the subscriber's library as well as e-mail existing clips from the library. In block 1914, the subscriber can optionally delete, hide, or restrict one or more images and/or animations from view or access by all or particular guests. In block 1916, the subscriber can optionally web-enable a subscriber's image or animation. Web-enabling an image or animation means that a (Uniform Reference Locator) URL is created that allows anyone on the Internet to view the image or animation upon accessing the URL. This feature is useful for integrating an image or an animation clip into a user's blog or web site. In block 1918, the subscriber may optionally e-mail an image or animation or a link thereto to a desired recipient. In block 1920, the subscriber may add an audio track, an annotation, or a caption to an image or animation in the subscriber's library.

Figure 20:
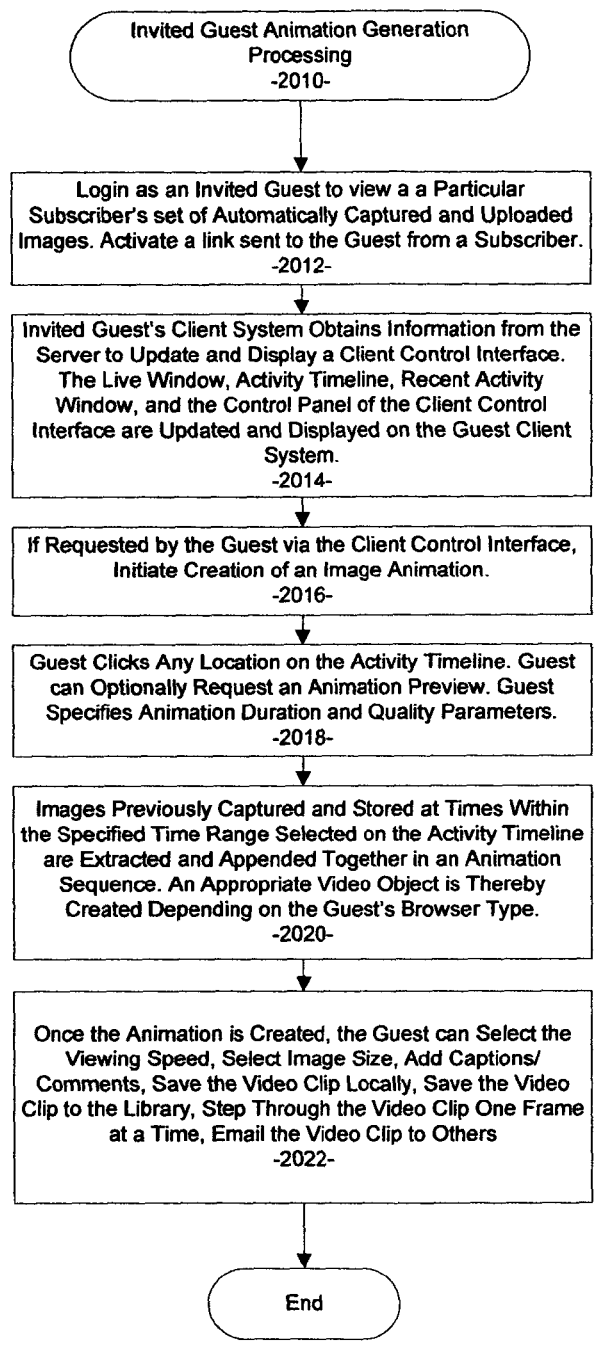
FIG. 20 is a flow diagram illustrating processing for invited guest animation generation.

Referring to FIG. 20, invited guest animation generation processing is illustrated. In block 2012, a user logs in as an invited guest to view a particular subscriber's collection (i.e. library) of automatically captured and uploaded images. As described above, the invited guest can obtain authorization to view a subscriber's library by activating a link sent to the guest from the subscriber. Once authorized, the invited guest may access the client control interface, with which the invited guest may view and manage access to the subscriber's image collection. As part of the client control interface, the server updates and displays a live window, an activity timeline, a recent activity window, and a control panel with which the invited guest may manage access to the subscriber's image collection (block 2014). Using the client control interface, the invited guests can view the subscriber's captured images. The activity timeline can be used to define which images the guest would like to view. The activity timeline can also be used to "preview" captured images. This option allows a single image to be shown from the timeline where the user clicks. In one embodiment, the previewed image is shown as a thumbnail image captured at a time corresponding to the time selected by the user on the timeline. Also, in a "delete" mode, the subscriber can click on a particular location on the timeline and associated images may be deleted. Further, the guest can use the client control interface to command the creation and display of an image animation (block 2016). To create an animation, the guest clicks any location on the activity timeline displayed as part of the client control interface. In one embodiment, the activity timeline is the primary way for a user to signal the conversion of images into video objects. The activity timeline is a visual representation of the subscriber's upload activity on a daily basis graphed over a 24-hour clock in a time zone local to the subscriber. This view can be assigned to any calendar day for which image archives exist for the subscriber. Once the user clicks any location on the activity timeline, an animation is created with the selected duration and quality (block 2018). As described above, images in the subscriber's library corresponding to the time selected on the activity timeline by the guest are combined to form an animation clip or video object (block 2020). The appropriate video object is created based on the browser type (for example, QuickTime for Mozilla and AVI for Windows Internet Explorer). The guest user can select the duration (anywhere from one minute to 12 hours) and the quality level (so as to avoid large file downloads, unless specifically desired). Once the animation is created, the guest can select the viewing speed, save the video clip to the library, step through the clip one frame at a time, or e-mail of video clip to others (block 2022).

Figure 21:
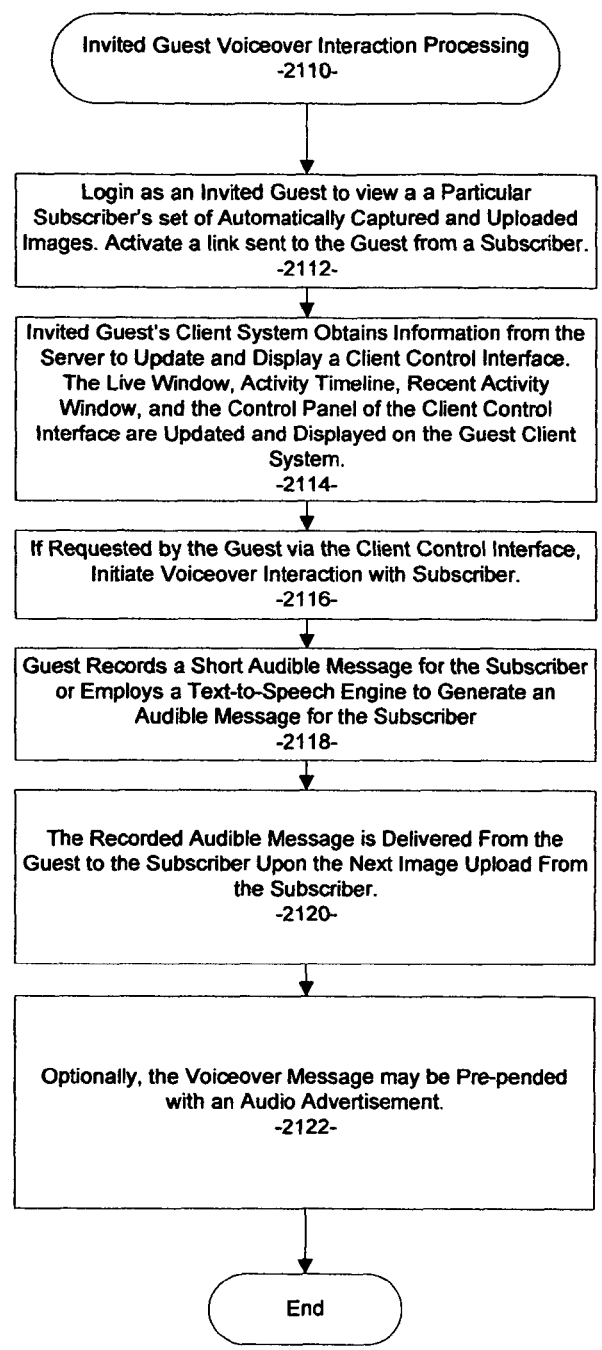
FIG. 21 is a flow diagram illustrating processing for invited guest voiceover interaction.
Figure 22:
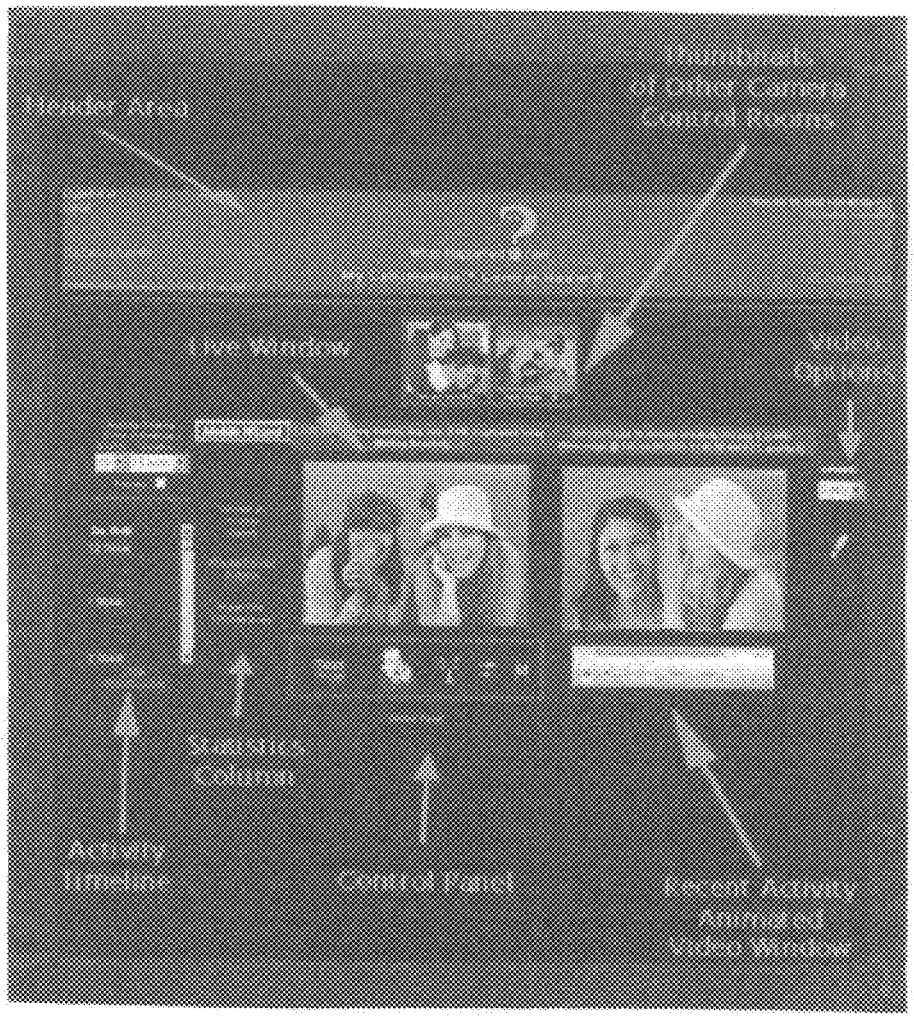
FIGS. 22-24 illustrate various embodiments of the client control user interface.
Figure 23:
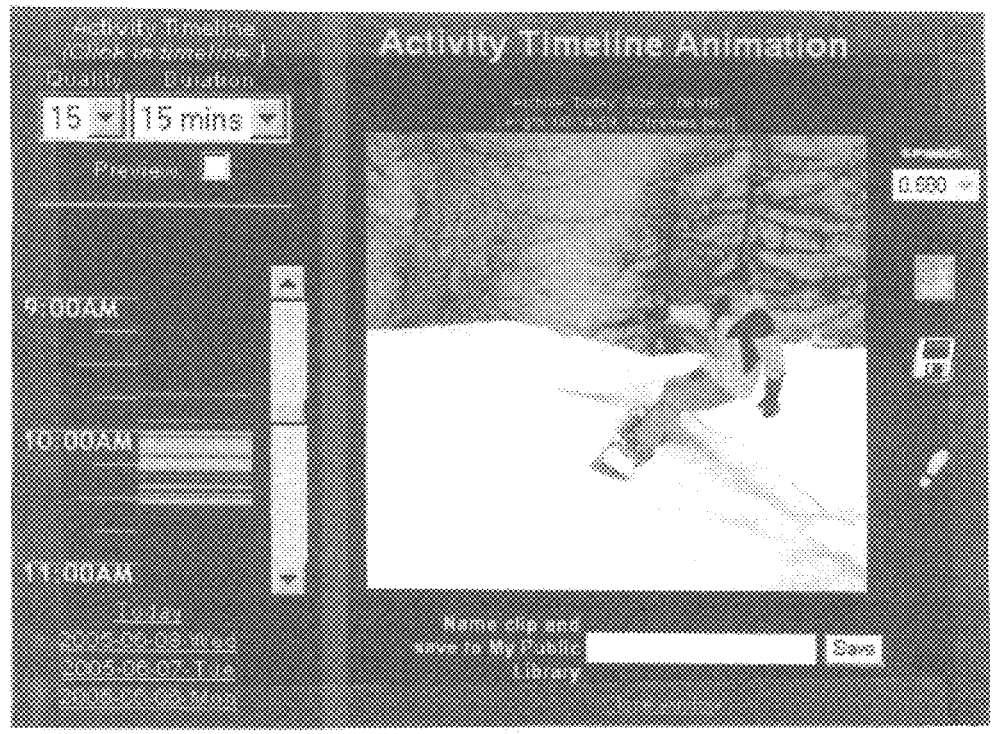
Figure 24:
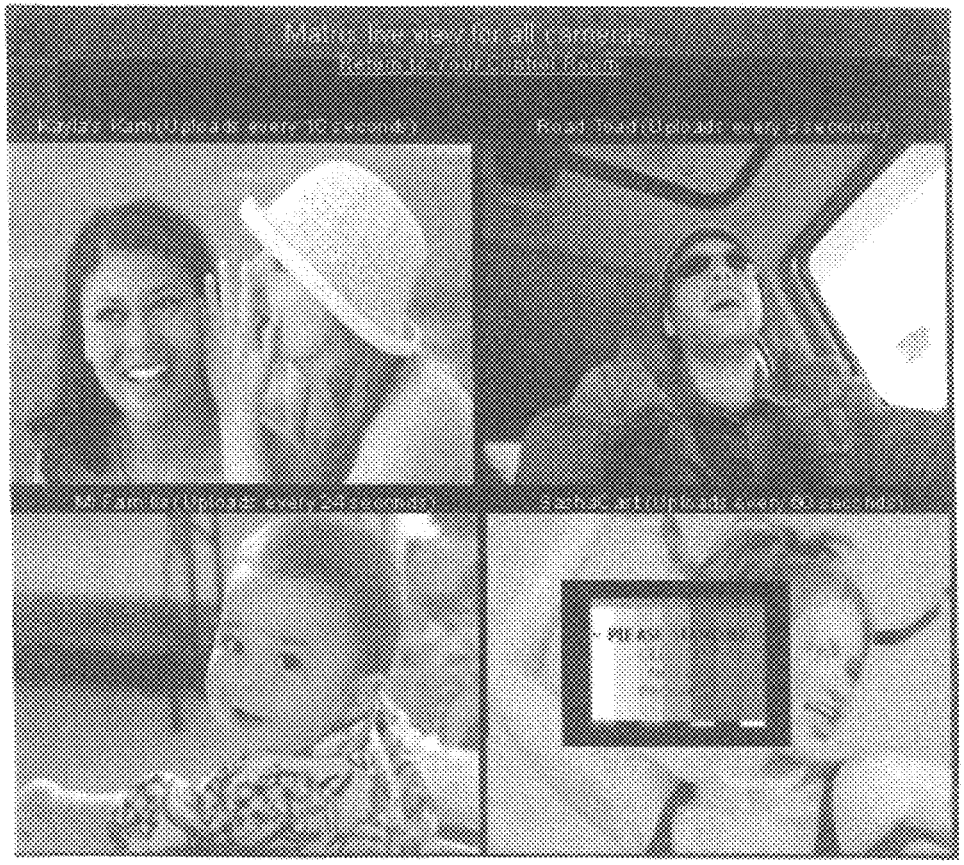

Referring to FIG. 21, invited guest voiceover interaction processing is illustrated. In block 2112, a user logs in as an invited guest to view a particular subscriber's collection (i.e. library) of automatically captured and uploaded images. As described above, the invited guest can obtain authorization to view a subscriber's library by activating a link sent to the guest from the subscriber. Once authorized, the invited guest may access the client control interface, with which the invited guest may view and manage access to the subscriber's image collection. As part of the client control interface, the server updates and displays a live window, and activity timeline, a recent activity window, and a control panel with which the invited guest may manage access to the subscriber's image collection (block 2114). Using the client control interface, the invited guests can view the subscriber's captured images. Further, the guest can use the client control interface to command the initiation of a voiceover interaction with the subscriber (block 2116). As part of the voiceover feature, the guest records a short audible message for the subscriber or employs a text to speech engine to generate an audible message for the subscriber (block 2118). The recorded audible message is delivered from the guest to the subscriber upon the next image upload from the subscriber (block 2120). In an alternative embodiment, the voiceover can be originated as a text message and converted to an audible message via conventional text-to-speech processing. Optionally, the voiceover message may be pre-pended or post-pended with an audio or textual advertisement, notice, or the like. Referring to FIG. 22, one embodiment of the client control user interface is illustrated. As shown, the client control user interface includes a live window in which the newly uploaded images are displayed. Incoming uploaded images replace the current image displayed in the live window as the new image is received. If no new image is received within a predetermined time period, the current image in the live window is replaced with a test pattern or a message that advises the user that a new uploaded image is not available. FIG. 22 also shows the recent activity window in which an animation of the last N minutes of uploaded images is displayed. FIG. 22 also illustrates the activity timeline with which a user can preview, delete, or select images for animation as described above. A more detailed view of the activity timeline is shown in FIG. 23. Note that the shaded areas to the right of the time scale indicate time periods in which images were uploaded. Referring again to FIG. 22, the client control user interface of one embodiment also includes a statistics column in which system metrics (e.g. upload speeds, etc.) are displayed. The client control user interface also provides a control panel with which the user can select a voiceover function as described above. FIG. 22 also shows a display of thumbnail images from other camera sources. An alternative matrix display is shown in FIG. 24 in which images from multiple sources can be displayed. FIG. 22 also provides control interfaces with which the user can specify video options for the image animations. A header area also provides useful information for the user. It will be apparent to those of ordinary skill in the art that many alternative equivalent implementations of the client control interface are possible. Such implementations are still within the scope of the claims that follow.

Notification

Notification refers to the capability of an embodiment to automatically notify relevant guests when particular events occur. For example, an event can be the starting of automatic image uploading activity. Further, notification can be used to alert guests or subscribers that automatic image uploading activity has stopped, stalled, been interrupted, disconnected, or otherwise encountered a problem. As will be described in more detail below, the timing and manner of notification is highly configurable by the guest. Notification functionality of one embodiment first develops information and processes around three basic notification themes. First, the notification functionality determines when appropriate guests are to be notified. Secondly, the notification functionality determines who the appropriate guests are who should be notified. Thirdly, the notification functionality determines how to notify appropriate guests.

When to Notify

As part of the operation of various embodiments, events may occur where it is desirable or necessary to notify someone. For example, a subscriber might want to notify invited or registered guests when the subscriber begins uploading images for access by the invited or registered guests. Notification enables registered guests to be alerted when a subscriber's new images become available. Because of notification, guests do not need to constantly check a subscriber web site for newly uploaded images. One benefit of having the guests receive their own notifications is that this process imposes little or no maintenance burden on the subscriber/broadcaster. In another example, a guest may want to be notified when a complete new image set or animation has been uploaded. Further, a subscriber might want to be notified if a guest accesses the uploaded images or if a problem occurs during the upload process. A set of users can also be notified when content on a webpage is accessed and/or altered (e.g. mashup sites). Consumers may want to be notified when new products or services are offered for sale. Business owners may want to notify consumers of sales or new product/service offerings. Auction sites may want to notify users when new bids are received. Financial institutions may want to notify users when economic events occur, such as a stock price reaching a threshold, a bank account reaching a limit, or a new asset becoming available/unavailable. As will be apparent to those of ordinary skill in the art, various events may trigger a notification operation. Various embodiments described herein are useful for managing these notification events.

Although various events could trigger a notification operation, it is not always convenient or desirable to send a notification in every case. For example, it would not be convenient to send a notification separately for the upload of each individual image in an image set. However, it might be desirable to send one notification when a complete image set has been uploaded or when a complete image set becomes available for viewing. In one embodiment, the concept of a session is used to define a series of operations related in time, function, or subject matter content. For example, a session might correspond to the upload of a complete image set. In another example, a session might correspond to a series of operations that occur within a time period after which there is a period of inactivity. Further, a session might correspond to the upload of images of related subject matter content. Finally, a session might correspond to the active connection of a client to server, a user to a web site, or other active connection between a sender and a receiver. The concept of a session in the context of example embodiments provides a unit of activity, after which (or prior to) a notification can be sent. As such, individual operations occurring within the session would not typically trigger a notification. Example embodiments use a process described in more detail below to notify guests at a desired frequency as a function of these broadcast (e.g. image or animation upload) sessions.

The concept of session as described herein is highly variable, context-sensitive, and configurable. The definition of session may vary depending on the application in which various embodiments are employed. In some cases, a session can be defined as a period of activity followed by a period of inactivity. In other embodiments, a session can be defined as a period of inactivity followed by a period of activity. As described in more detail below, various embodiments use session transitions and the time period since a prior notification to enable the transmission of a new notification. For example, if someone wants to be notified every hour, various embodiments described herein will not trigger a notification every hour, as long as the same party was notified at the beginning of the current session AND the session (without a session transition) has continued past one hour. In this case, the ONLY time that the frequency of notification is relevant, is if the session has stopped/started (i.e. transitioned). An example of this is as follows: someone starts uploading images of a wedding and a first guest is sent a notification of the broadcast event by an embodiment. In this case, a session transition occurs when the new image broadcast begins and thus the first notification is triggered. The first guest can start watching the wedding on his/her computer as the wedding image upload session continues. The wedding is two hours long, and the first guest had previously opted to be notified of a broadcast event every hour. In this case, even though the first guest had previously opted to be notified every hour, the first guest will ONLY get one notification (the first notification), because the session never stopped/restarted (i.e. transitioned) since the original notification was sent. This is an example of how various embodiments use session transitions and the time period since a prior notification and the guest's previously configured notification frequency to enable the transmission of a new notification. Now, continuing with the example presented above, if the wedding image broadcast stops for a period of time, and then starts again (i.e. a session transition occurs), then the first guest may get a second notification in the second hour after the broadcast originally began.

In other examples of the concept of sessions and events in various embodiments, suppose an event is defined in a particular embodiment as either an image not being received for a pre-configured period of time, or an image is received but the content of the image does not change for pre-configured period of time (e.g. no motion detected). Clearly, each of these pre-configured periods of time can also be configured with tolerances such that an event is triggered only after the time period and the tolerance is exceeded. In this manner, the lack of image reception or the lack of motion detection for a pre-configured period of time is defined as the beginning of a "session" (of inactivity). The beginning of the session is also a session transition that is used in various embodiments to trigger a notification to an appropriate party. In the example above, a session (of inactivity) is defined by the lack of change in the received image content for a pre-configured period of time. In other embodiments, a "session" can be defined as the content of received images being sufficiently similar. In this case, a session transition occurs when the image content varies from the previously similar content. In other embodiments, a "session" can be defined as the content of received images being sufficiently different. In this case, a session transition occurs when the image content begins being sufficiently similar. In another example, a price has changed on a part, but the price change is not significant enough to warrant notification. In this case, the price change is still within the "ignore it" range (e.g. below a tolerance) and no session transition occurs. Now the price for the part has fallen by 50% (or some other configurable tolerance value or percentage) and this price reduction is significant enough to exceed the pre-configured tolerance and trigger the start of a price reduction session (e.g. a session transition). In this case, the price reduction session transition can be used in various embodiments to trigger a notification to appropriate parties. In these cases, it is the fact that a pre-configured tolerance has been exceeded that indicates a session transition has occurred and a notification can be sent. As described above, a session can be defined as either a period of inactivity or a period of activity.

Having described that sessions and session transitions can be used to trigger notification, it is also important to make sure that guests or others do not receive an excessive number of notification transmissions. Thus, an embodiment makes sure that prior to sending a notification to a particular guest, a check is made to determine if a sufficient amount of time has elapsed since a prior notification was sent to the same guest. It is also important to retain information indicative of the sensitivity of each guest in relation to notification. For example, some individuals may want frequent and timely notifications. Others may want little, infrequent, delayed, clustered, or no notifications. Others may want notification only at particular times and not at other times. The notification desires and sensitivities of particular individuals should be configurable, retained, and used to determine when or if notification to particular individuals is sent.

Who to Notify

The subscriber can make his or her collection of images and/or animations resident in server 820 accessible and viewable by other authorized users. The subscriber creates a list of guests authorized to view the subscriber's image collection or animations. The authorized guests can be identified by name, e-mail address, login identity, registration ID, Instant Message (IM) identity, user number, IP address, MAC address, Ethernet address, or any of a variety of other unique identifiers assignable to a guest user. A subscriber can invite a set of guest users via e-mail, instant message, web site link, and the like. The authorized guest list can then be generated based on responses from invited guests. Alternatively, the subscriber can enable guests to register at a subscriber web site. The subscriber can also generate an authorized guest list based on a set of users registered on a third-party web site, blog, podcast, bulletin board, user group, organization, business, governmental entity, and the like. Further, the subscriber can generate an authorized guest list based on those users who respond (e.g. click through) to an online advertisement, coupon, message, link, and the like. The subscriber can generate an authorized guest list based on a set of users who buy a product, access the same product catalog category, or bid on similar products in an online auction. Further, an authorized guest list can be based on geographical or demographic characteristics of particular users. Using these methods or any of a variety of other methods for creating a list of users, the subscriber can create and maintain an authorized guest list. A unique guest list can be created for each collection of images or animations uploaded and published by a subscriber. When an event triggers the need to send a notification as described above, notifications can be sent to each guest on the authorized guest list corresponding to the event. In an alternative embodiment, multiple guest lists can be maintained for each collection of images or animations of a particular subscriber. When an event triggers the need to send a notification and depending on the time of day, day of the week, day of the month, season, or year, a particular guest list corresponding to the event at the particular time can be chosen and used to send notifications to the appropriate guests.

How to Notify

When an event triggers the need to send a notification and the appropriate authorized guest list is obtained as described above, the embodiment sends a notification to each user on the guest list using one or more of several notification methods. These notification methods include e-mail, e-mail with an attached image or video clip, e-mail with an embedded link or URL, instant message, text message or instant message that includes a link or URL, automated phone call, automatically generated audio message, page, fax, or any of a variety of well-known communication methods via wired or wireless infrastructures. When the guest receives the notification, the guest can use a link or URL to easily and instantly navigate to a corresponding website or webpage and see the broadcasting activity or an informative message. Notification in one embodiment via text message can be a good revenue generator for a mobile operator; because, a single subscriber may have dozens of guests. Each time a subscriber starts broadcasting, a large number of text messages may be generated, thereby generating revenue for a mobile operator.

Figure 25:
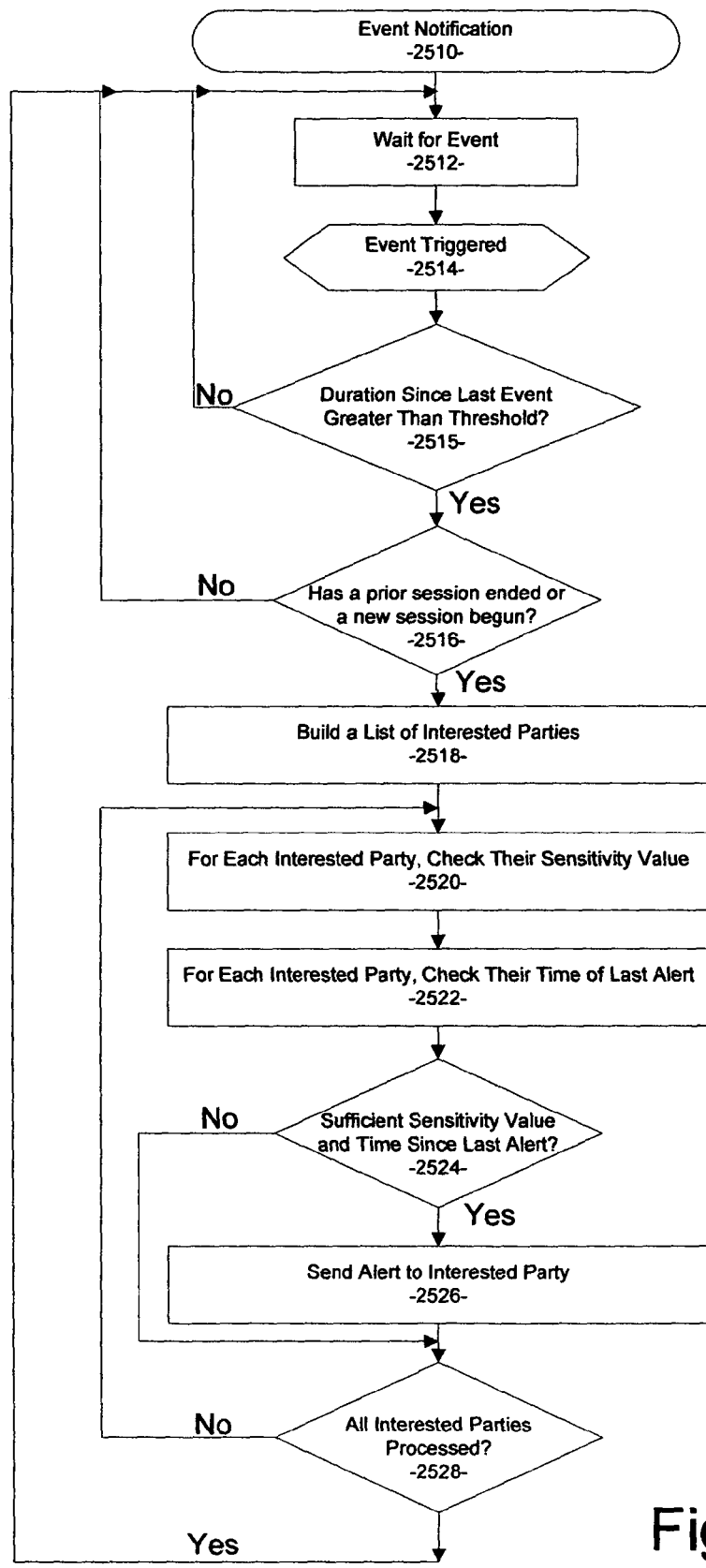
FIG. 25 is a processing flow diagram illustrating a processing sequence performed in one embodiment of the event notification process.

Referring to FIG. 25, a processing flow diagram illustrates a processing sequence performed in one embodiment. The processing flow illustrated in FIG. 25 describes one embodiment of the event notification process. Such processing can be implemented in server 820, for example. At processing block 2512, an event detector waits for the occurrence of an event requiring notification, such as the variety of events described above. When such an event triggers the potential need for user notification (block 2514), further notification processing is executed. At decision block 2515, the event detector determines the amount of time that has elapsed since the occurrence of a prior event requiring notification. In order to prevent an excessive number of notifications, the event detector checks the time duration since the last event requiring notification. If the amount of time that has elapsed since the occurrence of a prior event requiring notification is not greater than a pre-configured threshold, processing continues at block 2512, where the event detector awaits the next event. If the amount of time that has elapsed since the occurrence of a prior event requiring notification is greater than a pre-configured threshold, processing continues at decision block 2516. At decision block 2516, the event detector checks to determine if a session transition has occurred. As described above, the beginning or ending of a session (e.g. session transition) can occur based on a new period of inactivity, a new period of activity, a transition through a pre-configured tolerance, or the like. If a session transition has not occurred, processing continues at block 2512, where the event detector awaits the next event. If a session transition has occurred (decision block 2516), processing continues at block 2518. At block 2518, a list of interested parties or authorized guests is generated. At block 2520 and 2522, a notifier checks the sensitivity and time since the last notification of each user on the list of interested parties. The user sensitivity and timing information is used to ensure that an excessive number of notifications or unwelcome notifications are not sent to particular users on the list of interested parties. In decision block 2524, if a particular user on the list of interested parties does not wish notification in this instance or if a sufficient amount of time has not elapsed since the last alert, notifier processing continues at decision block 2528. In decision block 2524, if a particular user on the list of interested parties does wish notification in this instance and if a sufficient amount of time has elapsed since the last alert, notifier processing continues at block 2526, where a notification for the particular interested party is generated and sent to that party. As described above, this notification can be sent in a variety of configurable methods. At decision block 2528, a loop continues back to processing block 2520 until each of the parties on the list of interested parties is processed by the notifier. In this manner, various types of notifications can be sent to each party on a list of interested parties upon the occurrence of a particular event. Upon completion of processing for each party on the list of interested parties for this event, processing continues at block 2512, where the system awaits the occurrence of the next event.

The structure and operation of an embodiment is described herein. Applications for the described and claimed invention are numerous and varied, with a subset described here. The two main categories can be broken into commercial and consumer.

Commercial applications include security/monitoring, and data generation for operations research. Security and monitoring using a mobile camera-enabled mobile device allows flexibility in placement of the device (vs. attaching a fixed camera) and allows the use of ubiquitous, low-cost wireless (e.g. cell phone) networks. Hence, environments that are not typical factory or office facilities can be monitored as long as there is a power source and cell phone reception. Images may be uploaded and conventional motion detection used on a server to detect if images have changed. The system can be configured to automatically send notifications to appropriate parties upon an image change event using the methods described herein to alert parties of a potential security threat. Further, the system can be configured to automatically send notifications to appropriate parties using the methods described herein if images have remained unchanged for a pre-configured period of time. In this case, the lack of image changes can mean that the equipment has failed, because the lack of image activity over too long a period of time would not normally be expected. In another application, using the methods described herein, images may be uploaded at regular intervals just to create network activity for security purposes. For example, if a burglar breaks into a building and shuts off power or destroys/turns off the computer system, then a notification can be sent as a result of the lack of activity at the next expected upload interval. The images uploaded to the point of failure can be used to detect the problem/person. In any case, the analysis and monitoring of image content can be used to trigger a notification event.

Operations research can be dramatically enhanced by placing camera-enabled mobile devices, coupled with the various embodiments described herein, into a fleet of vehicles or trucks of a business. A delivery company can remotely monitor all the activity of a vehicle, and archive/animate the activity by using low-cost cell phone technology (coupled with an embodiment).

Consumer applications are primarily for entertainment and near real-time sharing of activity, bring people closer and enabling them to be "content creators." Distant relatives can watch a remote family event (birthday, wedding, etc.) through the use of this invention (which otherwise could not be possible). As well, consumer applications can use the security/monitoring aspect. A parent could place the mobile device near an infant in a crib or near a pool in their backyard, and monitor the activity in their office with their computer (or on their mobile device as well). Without the invention, these scenarios would be much less convenient (much less ad hoc) and much, much more expensive to create.

Thus, a computer-implemented system and method for notifying users upon the occurrence of an event is disclosed. While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

I claim:

1. A method, comprising:
   detecting, during an upload session for a set of images, that first content of an uploaded image of the set of images varies, according to a defined measure, from second content of a previously uploaded image of the set of images; and
   in response to the detecting:
      determining a time that has elapsed since a previous notification was sent to at least one recipient of a set of recipients associated with the upload session; and
      initiating sending of a notification of the upload session to the at least one recipient in response to the time meeting a condition with respect to a duration specified by a notification frequency preference associated with the at least one recipient.

2. The method of claim 1, further comprising receiving the set of images from a camera-enabled mobile device.

3. The method of claim 1, further comprising defining the set of recipients to include at least one authorized guest invited by an originator of the upload session.

4. The method of claim 1, wherein the initiating comprises initiating sending of an email with an embedded link.

5. The method of claim 1, wherein the initiating comprises initiating sending of a text message with an embedded link.

6. The method of claim 1, wherein the initiating comprises initiating an automated phone call.

7. The method of claim 1, wherein the initiating comprises initiating sending of an audio message.

8. The method of claim 1, wherein the initiating comprises initiating sending of a message with an embedded uniform resource locator.

9. The method of claim 1, wherein the initiating comprises initiating the sending of the notification of the upload session to the at least one recipient in response to a determination that the at least one recipient has not been previously notified of the upload session.

10. The method of claim 1, further comprising:
initiating a sending of a different notification to the at least one recipient in response to detecting that content of multiple sequential images of the set of images has not changed for a pre-configured period of time.

11. The method of claim 1, further comprising:
detecting that an image of the set of images has not been uploaded for a period of time; and
in response to the detecting that the image has not been uploaded:
   determining the time that has elapsed since the previous notification was sent to the at least one recipient; and
   sending a second notification of the upload session to the at least one recipient in response to the time meeting the condition.

12. An apparatus, comprising:
an event detector configured to detect, as a session transition, that first content of an uploaded image, of a set of images being uploaded to a server as part of an upload session, differs according to a defined measure from second content of a previously uploaded image of the set of images; and
a notifier configured to send, in response to detection of the session transition, a notification to at least one party of a set of parties associated with the upload session in response to a determination that a time, which has elapsed since a previous notification was sent to the at least one party, meets a condition with respect to a duration defined by a notification frequency setting associated with the at least one party.

13. The apparatus of claim 12, wherein the notification is an email with an embedded link.

14. The apparatus of claim 12, wherein the notification is a message with an embedded uniform resource locator.

15. The apparatus of claim 12, wherein the notifier is further configured to send the notification to the at least one party in response to a determination that the at least one party has not been notified of the upload session.

16. The apparatus of claim 12, wherein the notifier is further configured to notify the at least one party in response to a determination that no images have been uploaded for a pre-configured amount of time during the upload session.

17. The apparatus of claim 12, wherein the notification is a first notification, and the notifier is further configured to send a second notification to the at least one party in response to a determination that no images have been uploaded for a defined duration during the upload session.

18. The apparatus of claim 12, wherein the notification is an automated phone call.

19. The apparatus of claim 12, wherein the notification is an audio message.

20. A non-transitory computer-readable medium having stored thereon computer-executable instructions that, in response to execution, cause a system to perform operations, comprising:
detecting that first content of a first image uploaded to a network device varies, according to a defined measure, from second content of a second image uploaded prior to uploading of the first image during an uploading session;
determining, in response to the detecting, an elapsed time since a previous notification was sent to at least one recipient; and
generating a notification for the at least one recipient in response to the elapsed time exceeding a duration indicated in a notification frequency setting associated with the at least one recipient.

21. The non-transitory computer-readable medium of claim 20, wherein the generating comprises generating the notification in response to determining that the at least one recipient has not previously been notified of the session.

22. The non-transitory computer-readable medium of claim 20, wherein the operations further comprise:
generating another notification for the at least one recipient in response to detecting that content of a plurality of uploaded images has not varied, according to a defined measure, for a pre-configured period of time.

23. The non-transitory computer-readable medium of claim 20, wherein the operations further comprise:
generating another notification for the at least one recipient in response to detecting that an image has not been uploaded for a duration of time during the upload session.

24. The non-transitory computer-readable medium of claim 20, wherein the generating the notification comprises generating an email containing an embedded link.

25. The non-transitory computer-readable medium of claim 20, wherein the sending a notification comprises sending a text message containing an embedded link.

26. The non-transitory computer-readable medium of claim 20, wherein the generating the notification comprises generating an automated phone call.

27. The non-transitory computer-readable medium of claim 20, wherein the generating the notification comprises generating an audio message.

28. A system, comprising:
means for determining, during a session of uploading a plurality of images to a server, that first content of an image uploaded to the server differs, according to a defined criterion, from second content of another image uploaded previously in the session;
means for determining, in response to an output from the means for determining, a time that has elapsed since a previous notification was sent to at least one recipient of a set of recipients associated with the session; and
means for sending a notification to the at least one recipient in response to the time being greater than a duration defined by a notification frequency preference associated with the at least one recipient.

29. The system of claim 28, wherein the means for sending comprises means for sending the notification in response to the time exceeding a threshold.

30. The system of claim 28, wherein the means for sending comprises means for sending the notification to the at least one recipient in response to a determination that the at least one recipient has not been notified of the session.

31. The system of claim 28, wherein the means for sending comprises means for emailing a message containing an embedded link.

32. The system of claim 28, wherein the means for sending comprises means for issuing a text message containing an embedded link.

33. The system of claim 28, wherein the means for sending comprises means for issuing an automated phone call.

34. The system of claim 28, wherein the means for sending comprises means for issuing an audio message.

* * * * *